(12) United States Patent
Dunn

(10) Patent No.: US 12,263,440 B2
(45) Date of Patent: *Apr. 1, 2025

(54) CARBON CAPTURE SYSTEMS

(71) Applicant: Enhanced Energy Group LLC, W. Kingston, RI (US)

(72) Inventor: Paul M. Dunn, W. Kingston, RI (US)

(73) Assignee: Enhanced Energy Group LLC, West Kingston, RI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/444,992

(22) Filed: Feb. 19, 2024

(65) Prior Publication Data

US 2024/0189757 A1    Jun. 13, 2024

Related U.S. Application Data

(63) Continuation of application No. 17/464,199, filed on Sep. 1, 2021, now Pat. No. 11,931,685.

(60) Provisional application No. 63/076,521, filed on Sep. 10, 2020.

(51) Int. Cl.
    *B01D 53/04*    (2006.01)

(52) U.S. Cl.
    CPC .... *B01D 53/0462* (2013.01); *B01D 2253/116* (2013.01); *B01D 2256/10* (2013.01); *B01D 2257/504* (2013.01); *B01D 2257/80* (2013.01); *B01D 2258/01* (2013.01); *B01D 2259/40003* (2013.01); *B01D 2259/40007* (2013.01);
    (Continued)

(58) Field of Classification Search
    CPC ................ B01D 53/04; B01D 53/0462; B01D 2253/108; B01D 2253/116; B01D 2256/10; B01D 2257/302; B01D 2257/404; B01D 2257/502
    See application file for complete search history.

(56) References Cited

U.S. PATENT DOCUMENTS

| 2,884,912 A | 5/1959 | Lewis |
| 3,134,228 A | 5/1964 | Wolansky |
| 3,559,402 A | 2/1971 | Stone |

(Continued)

FOREIGN PATENT DOCUMENTS

| EP | 2246551 B1 | 11/2017 |
| GB | 2365492 A | 2/2002 |

(Continued)

OTHER PUBLICATIONS

Hailong Li et al., Technologies for increasing CO2 concentration in exhaust gas from natural gas-fired power production with post-combustion, amine-based CO2 capture, Energy, vol. 36, No. 2, 2010, pp. 1124-1133.

*Primary Examiner* — Sharon Pregler

(57) ABSTRACT

A carbon capture system can include a plurality of $CO_2$ thermal swing adsorption (TSA) beds. The plurality of $CO_2$ TSA beds can include at least a first TSA bed, a second TSA bed, and a third TSA bed configured to capture $CO_2$ within a capture temperature range and to regenerate the captured $CO_2$ at a regeneration temperature range above the capture temperature range. The carbon capture system can include a plurality of valves and associated flow paths configured to allow switching operational modes of each of the first, second, and third TSA beds.

20 Claims, 31 Drawing Sheets

(52) U.S. Cl.
CPC .................. *B01D 2259/403* (2013.01); *B01D 2259/4061* (2013.01); *B01D 2259/4148* (2013.01)

(56) References Cited

U.S. PATENT DOCUMENTS

| | | | |
|---|---|---|---|
| 3,736,745 | A | 6/1973 | Karig |
| 3,980,064 | A | 9/1976 | Ariga |
| 4,434,613 | A | 3/1984 | Stahl |
| 4,674,463 | A | 6/1987 | Duckworth |
| 4,899,544 | A | 2/1990 | Boyd |
| 6,251,164 | B1 | 6/2001 | Notaro |
| 6,256,994 | B1 | 7/2001 | Dillon, IV |
| 6,622,470 | B2 | 9/2003 | Viteri |
| 6,637,183 | B2 | 10/2003 | Viteri |
| 7,043,920 | B2 | 5/2006 | Viteri |
| 7,472,550 | B2 | 1/2009 | Lear, Jr. |
| 7,543,577 | B2 | 6/2009 | Ha |
| 7,827,794 | B1 | 11/2010 | Pronske |
| 7,882,692 | B2 | 2/2011 | Pronske |
| 7,926,275 | B1 | 4/2011 | Dunn |
| 7,926,276 | B1 | 4/2011 | Dunn |
| 7,937,930 | B1 | 5/2011 | Dunn |
| 7,951,339 | B1 | 5/2011 | Dunn |
| 8,156,726 | B1 | 4/2012 | Dunn |
| 8,205,455 | B2 | 6/2012 | Popovic |
| 8,475,571 | B2 | 7/2013 | Oppenheim et al. |
| 8,596,075 | B2 | 12/2013 | Allam |
| 8,776,532 | B2 | 7/2014 | Allam |
| 8,869,889 | B2 | 10/2014 | Palmer |
| 8,945,292 | B2 | 2/2015 | Oppenheim et al. |
| 10,584,633 | B2 | 3/2020 | Dunn |
| 2001/0042367 | A1 | 11/2001 | Frutschi |
| 2004/0003592 | A1 | 1/2004 | Viteri |
| 2004/0221578 | A1 | 11/2004 | Iijima et al. |
| 2005/0199231 | A1 | 9/2005 | Heider |
| 2008/0104958 | A1 | 5/2008 | Finkenrath et al. |
| 2008/0282888 | A1* | 11/2008 | Deckman ........... B01D 53/0462 95/126 |
| 2010/0326084 | A1 | 12/2010 | Anderson |
| 2011/0138766 | A1 | 6/2011 | Elkady |
| 2011/0192139 | A1 | 8/2011 | Paik |
| 2012/0023956 | A1 | 2/2012 | Popovic |
| 2012/0042656 | A1 | 2/2012 | Donnelly |
| 2012/0079852 | A1 | 4/2012 | Northrop |
| 2014/0230401 | A1 | 8/2014 | Dunn |
| 2017/0368495 | A1 | 12/2017 | Mabrouk et al. |

FOREIGN PATENT DOCUMENTS

| | | |
|---|---|---|
| WO | 2001090548 A1 | 11/2001 |
| WO | 2008115330 A1 | 9/2008 |
| WO | 2012003079 A1 | 1/2012 |
| WO | 2019035896 A1 | 2/2019 |
| WO | 2020124078 A1 | 6/2020 |

* cited by examiner

PSA Capture with NOx Regeneration Timing Chart

| Total Cycle Time (hours) | Clock Time (minutes) | Vessel PS1 Function | Vessel PS2 Function | Vessel PS3 Function | Valve Positions | | | | | | | | | | | |
|---|---|---|---|---|---|---|---|---|---|---|---|---|---|---|---|---|
| | | | | | P1In | P1T | P1H | P1D | P1P | P1X | P2In | P2T | P2H | P2D | P2P | P2X |
| 0.25 | 0-4 | Adsorption | Production | Regeneration | Open | Open | Closed | Closed | Closed | Closed | Closed | Closed | Closed | Open | Closed | Closed |
| | 4-5 | Adsorption | Prod w/Purge | Regeneration | Open | Open | Closed | Closed | Closed | Closed | Closed | Closed | Closed | Open | Open | Closed |
| | 5-9 | Production | Adsorption | Regeneration | Closed | Closed | Closed | Open | Closed | Closed | Open | Open | Closed | Closed | Closed | Closed |
| | 9-10 | Prod w/Purge | Adsorption | Regeneration | Closed | Closed | Closed | Open | Open | Closed | Open | Open | Closed | Closed | Closed | Closed |
| 0.25 | Repeats 0.25 hr | | | Continue for Hours | | | | | | | | | | | | |

| Total Cycle Time (hours) | Clock Time (minutes) | Vessel PS1 Function | Vessel PS2 Function | Vessel PS3 Function | Valve Positions | | | | | |
|---|---|---|---|---|---|---|---|---|---|---|
| | | | | | P3In | P3T | P3H | P3D | P3P | P3X |
| 0.25 | 0-4 | Adsorption | Production | Regeneration | Closed | Closed | Open | Closed | Closed | Open |
| | 4-5 | Adsorption | Prod w/Purge | Regeneration | Closed | Closed | Open | Closed | Closed | Open |
| | 5-9 | Production | Adsorption | Regeneration | Closed | Closed | Open | Closed | Closed | Open |
| | 9-10 | Prod w/Purge | Adsorption | Regeneration | Closed | Closed | Open | Closed | Closed | Open |
| 0.25 | Repeats 0.25 hr | | | Continue for Hours | | | | | | Open |

PSA 2nd Stage Purification Timing Chart

| Total Cycle Time (hours) | Clock Time (hours) | Vessel TS4 Function | Vessel TS5 Function | Valve Positions | | | | | | | |
|---|---|---|---|---|---|---|---|---|---|---|---|
| | | | | P4In | P4V | P4D | P4P | P5In | P5V | P5D | P5P |
| 0.25 | 0-5 | Adsorption | Production | Open | Open | Closed | Closed | Closed | Closed | Open | Closed |
| | 5-10 | Production | Adsorption | Closed | Closed | Open | Closed | Open | Open | Closed | Closed |
| 8 | Repeat | | | | | | | | | | |

Fig. 1B

Dehydration Process, Two Bed TSA

| Total Cycle Time (hours) | Clock Time (hours) | Vessel TSA 1 Function | Vessel TSA 2 Function | T1In | T1X | T1h | T1C | T1D | T2In | T2X | T2H | T2C | T2D |
|---|---|---|---|---|---|---|---|---|---|---|---|---|---|
| 8 | 0-2 | Adsorption | Regeneration | Open | Closed | Closed | Closed | Open | Closed | Open | Open | Closed | Closed |
|  | 2-4 | Adsorption | Cooling | Open | Closed | Closed | Closed | Open | Closed | Open | Closed | Open | Closed |
|  | 4-6 | Regeneration | Adsorption | Closed | Open | Open | Closed | Closed | Open | Closed | Closed | Closed | Open |
|  | 6-8 | Cooling | Adsorption | Closed | Open | Closed | Open | Closed | Open | Closed | Closed | Closed | Open |
| 8 | Repeat |  |  |  |  |  |  |  |  |  |  |  |  |

Capture Process, Three Bed TSA

| Total Cycle Time (hours) | Clock Time (minutes) | Vessel TS3 Function | Vessel TS4 Function | Vessel TS5 Function | T3In | T3X | T3H | T3T | T3C | T3D | T4In | T4X | T4H | T4T | T4C | T4D | T5In | T5X | T5H | T5T | T5C | T5D |
|---|---|---|---|---|---|---|---|---|---|---|---|---|---|---|---|---|---|---|---|---|---|---|
| 1 | 0-20 | Adsorption | Cooling | Regeneration | Open | Closed | Closed | Closed | Closed | Open | Closed | Open | Closed | Open | Closed | Closed | Closed | Open | Open | Closed | Closed | Closed |
|  | 20-40 | Regeneration | Adsorption | Cooling | Closed | Open | Open | Closed | Closed | Closed | Open | Closed | Closed | Closed | Closed | Open | Closed | Open | Closed | Open | Closed | Closed |
|  | 40-60 | Cooling | Regeneration | Adsorption | Closed | Open | Closed | Open | Closed | Closed | Closed | Open | Open | Closed | Closed | Closed | Open | Closed | Closed | Closed | Closed | Open |
| 1 | Repeat |  |  |  |  |  |  |  |  |  |  |  |  |  |  |  |  |  |  |  |  |  |

Fig. 2B

Top down bed flow for cooling and regeneration (higher flowrates)

Bottom up bed flow for adsorption (lower flowrates)

CARBON CAPTURE SYSTEMS

CROSS-REFERENCE TO RELATED APPLICATIONS

This Patent Application is a continuation of and claims the benefit of priority to U.S. Nonprovisional patent application Ser. No. 17/464,199, filed on Sep. 1, 2021, which claims the benefit of priority to U.S. Provisional Patent Application No. 63/076,521, filed on Sep. 10, 2020, the contents of which are incorporated herein by reference in their entirety.

FIELD

This disclosure relates to carbon capture systems (e.g., for semi-closed cycle engine systems).

BACKGROUND

Certain existing carbon capture technologies utilize pressure swing adsorption beds for capturing carbon dioxide from an exhaust flow. Traditional systems require multiple stages to produce carbon dioxide at a suitable purity, which increases energy demand to drive the flow through the system, which reduces the efficiency of the overall system.

Such conventional methods and systems have generally been considered satisfactory for their intended purpose. However, there is still a need in the art for improved carbon capture systems. The present disclosure provides a solution for this need.

SUMMARY

In accordance with at least one aspect of this disclosure, a carbon capture system can include a plurality of $CO_2$ thermal swing adsorption (TSA) beds. The plurality of $CO_2$ TSA beds can include at least a first TSA bed, a second TSA bed, and a third TSA bed configured to capture $CO_2$ within a capture temperature range and to regenerate the captured $CO_2$ at a regeneration temperature range above the capture temperature range. The carbon capture system can include a plurality of valves and associated flow paths configured to allow switching operational modes of each of the first, second, and third TSA beds.

The carbon capture system can include a control module configured to control the plurality of valves to provide continuous operation such that, simultaneously, at least one of the plurality of TSA beds is operated in a capture mode to remove $CO_2$ from an exhaust flow and to output a nitrogen flow, at least one of the plurality of TSA beds is used in a heated regeneration mode to release $CO_2$ into a production flow, and at least one of the one of the plurality of TSA beds is operated in a cooling mode to be cooled by a cooling flow.

The carbon capture system can be configured to be connected to a semi-closed cycle engine system to receive engine exhaust therefrom. In accordance with at least one aspect of this disclosure, a semi-closed cycle system (e.g., piston, turbine, or otherwise) can include any suitable embodiment of a carbon capture system disclosed herein.

The carbon capture system can include a production stream circulator subsystem selectively connected to each TSA bed and configured to circulate the production flow through a respective TSA bed in regeneration mode to regenerate additional CO2 from the TSA bed to increase CO2 concentration in the production flow. The production stream circulator subsystem can include a heat source configured to add heat to the production flow sufficient to heat the respective TSA bed operated in regeneration mode to within a regeneration temperature range. The production stream circulator subsystem can include a motive source configured to move the production flow within the circulator. The production stream circulator subsystem can be in fluid communication with a $CO_2$ output subsystem.

The heat source can be a waste heat exchanger configured to be in thermal communication with the exhaust flow downstream of the engine. The motive source can be a compressor connected to a turbine. In certain embodiments, the waste heat exchanger can be in fluid communication between the compressor and the turbine such that waste heat drives the turbine to power the compressor.

In certain embodiments, the carbon capture system can include a flow mover (e.g., blower, compressor, or fan) configured to provide motive flow to the exhaust flow to flow through the carbon capture system to a respective TSA bed operated in the capture mode. In certain embodiments, the carbon capture system can include a dehydration subsystem downstream of the flow mover and upstream of at least one of the first, second, and third TSA beds to remove water upstream of at least one of the first, second, and third TSA beds operating in the capture mode.

In certain embodiments, the dehydration subsystem can include at least two dehydration TSAs and associated valves. The control module can be configured to operate the at least two dehydration TSAs such that a first dehydration TSA can be operated in a water capture mode to output dry exhaust to at least one of the plurality of $CO_2$ TSAs, and a second dehydration TSA can be operated in a water regeneration mode using the nitrogen flow from the plurality of $CO_2$ TSAs that has been heated or in a cooling mode using the nitrogen flow from the plurality of $CO_2$ TSAs that has been cooled, for example. In certain embodiments, the dehydration subsystem can be integrated with each of the first, second, and third TSA beds to remove water and $CO_2$ in the same location.

In certain embodiments, a nitrogen recirculation system can have a nitrogen flow mover configured to recirculate nitrogen output by a respective TSA bed in the capture mode in order to increase cooling effect of the first, second, and third TSA beds when operated in the cooling mode. In certain embodiments, the system can include a dehydration subsystem downstream of at least then first, second, and third TSA beds when operated in production mode to remove water downstream of at least one of the first, second, and third TSA beds operating in the production mode.

In accordance with at least one aspect of this disclosure, a carbon capture system can include a thermal swing adsorption (TSA) bed configured to capture $CO_2$ within a capture temperature range and to regenerate the captured $CO_2$ at a regeneration temperature range above the capture temperature range, and a production stream circulator subsystem selectively connected to the TSA bed and configured to circulate a heated production flow through a thermal swing adsorption (TSA) bed to regenerate additional $CO_2$ from the TSA bed to increase $CO_2$ concentration in the production flow. The production stream circulator subsystem can be any suitable embodiments of a production stream circulator, e.g., as disclosed above.

In accordance with at least one aspect of this disclosure, a method can include recirculating heated $CO_2$ rich production flow to a $CO_2$ TSA bed to increase $CO_2$ concentration in a production mode of the $CO_2$ TSA bed. The method can include using engine waste heat to heat the heated $CO_2$ rich production flow and to provide motive force to the heated $CO_2$ rich production flow. In certain embodiments, the method can include recirculating nitrogen to cool the TSA bed in a cooling mode. The method can include any other suitable method(s) and/or portion(s) thereof.

These and other features of the embodiments of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein:

FIG. 1B shows an embodiment of valve timing charts for the embodiment shown in FIG. 1A for each of the adsorption, regeneration/production, and cooling process, wherein a two bed de-hydration TSA chart is shown, and a three $CO_2$ pressure swing adsorption (PSA) bed chart is shown;

FIG. 2B shows an embodiment of valve timing charts for the embodiment shown in FIG. 2 for each the adsorption, regeneration/production, and cooling process as shown in FIG. 2A, wherein a two bed de-hydration TSA chart is shown, and a three $CO_2$ TSA bed chart is shown;

DETAILED DESCRIPTION

Figure 1:
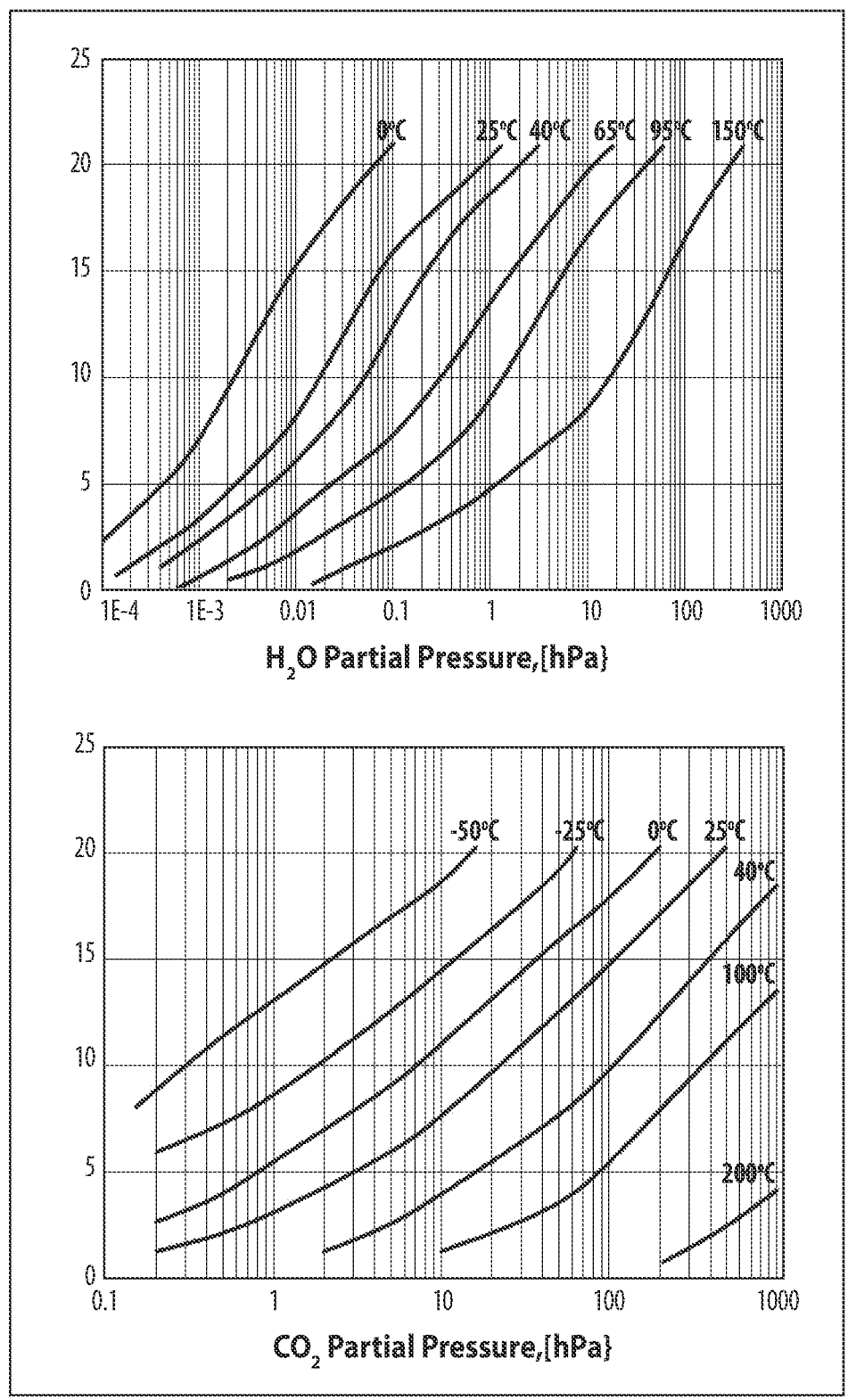
FIG. 1 shows typical molecular sieve isotherms for $H_2O$ and $CO_2$.

Reference will now be made to the drawings wherein like reference numerals identify similar structural features or aspects of the subject disclosure. For purposes of explanation and illustration, and not limitation, an illustrative view of a typical mole sieve isotherm for water and $CO_2$ is shown in FIG. 1. Other embodiments and/or aspects of this disclosure are shown in FIGS. 1A-20B.

Embodiments can enable carbon capture via $CO_2$ turbo thermal swing adsorption (TSA) for a semi-closed cycle engine system. Embodiments include an improved method of carbon capture, applicable in general to distributed power applications in the 0.5-25 MW range, for example. Embodiments can utilize a $CO_2$ recirculating thermal swing adsorption (TSA) process, useful in semi-closed cycle systems, but also applicable to any other suitable raw $CO_2$ source. Any suitable application(s) for any embodiment(s) of this disclosure is contemplated herein.

The method can use exhaust waste heat or supplemental heat as part of that process, and can further use that heat to mechanically drive components associated with the process. As a result, substantial reductions in carbon capture auxiliary loads can be achieved. Also disclosed are several mechanical implementations of the $CO_2$ TSA vessels and arrangements which can significantly lower the cost of construction, installation, and operation.

Embodiments of a semi-closed cycle system can operate the engine on an artificial atmosphere, created via a combination of air, cooled exhaust gas recirculation, and variable levels of oxygen injection (air enrichment), including none, to increase the raw $CO_2$ levels in the engine exhaust. Certain embodiments can use combinations of molecular sieves (e.g., pressure swing adsorption (PSA) and/or TSAs) and phase separation to purify the $CO_2$ to levels required for sequestration or other use. For molecular sieve processes, certain systems can employ thermal Swing, pressure Swing, or vacuum pressure swing processes, or combinations thereof. Embodiments can also use system waste heat and waste heat to power suitable components to integrate the available waste heat with requirements of the gas cleanup process, which as a result can deliver a higher net power and greater efficiency for the user.

Whether absorption based or adsorption based carbon capture is used, there are both electrical and/or mechanical loads for pumps, blowers, fans, and chillers, and thermal loads (often requiring steam) to heat the media or absorbent fluid to release the $CO_2$. The thermal loads can be usually handled via complex heat exchangers, since the heat source (e.g. steam, thermal oil) may not be compatible with direct contact with the media or absorbent. Although steam and other phase change heat sources may be compact, and commercial products exist to make steam (e.g. exhaust steam generator), the heat of vaporization of water itself is often not fully recovered, making such approaches less efficient.

The levels of $CO_2$ in the atmosphere have risen, and that rise correlates to the rapid development of the 20th century continuing to today, with levels rising from about 300 ppm, in the 1950's to over 400 ppm today. While conventional carbon capture techniques may be applied to stationary power plants, smaller distributed power plants, compressor stations, and off grid power requirements often do not lend themselves to conventional solutions. While the desire and methods to monetize the mitigation of $CO_2$ emissions is somewhat new, other engine pollutants, such as NOx, SOx, CO, and HC (unburned hydrocarbon), should also be mitigated. If one system could mitigate all pollutants, not just one or two, additional value would be created. Mole sieves have the advantage over other methods in that they can be designed to capture all pollutants, creating an essentially non-emissive power system, but mole sieves often require many stages, as and as a result have high auxiliary loads.

Embodiments of this disclosure utilize the molecular sieve adsorption process. Mole sieves are ceramic like media, available in various physical sizes (e.g., powder to ¼" round) and based on composition and crystal structure of the media, can be capable of adsorbing, or not adsorbing, particular species based mostly on the size of the molecule. For example, a 3A sieve will adsorb water ($H_2O$), ammonia ($NH_3$), and little else. Molecules like $CO_2$, $O_2$, $N_2$, and Argon would pass through the sieve. The 3A sieve (and alumina) are typically used in dehydration processes. The 5A sieve will absorb all the species of the 3A but will also adsorb $CO_2$ and most pollutants (CO, HC, NOx) while allowing $O_2$, $N_2$, and Argon to pass for the most part. The 13X sieve captures larger molecules, but still allows $O_2$, $N_2$, and Argon to pass. Mole sieves adsorb the desired species when they are cold, and/or when the partial pressure of that species is high. The mole sieves release the desired species when temperature is increased, and/or the pressure is lowered.

Embodiments can lower the cost of carbon capture in small distributed applications, e.g., between about 0.5 MW and 25 MW per engine. Embodiments can enable the use of high performance molecular sieves, in a thermal swing adsorption (TSA) process, in a manner which does not dilute the purity of or reduce the capture efficiency of the $CO_2$. Embodiments can substantially reduce electrical and/or mechanical loads associated with carbon capture. Embodiments can improve the state of the art in construction of TSA "vessels" to lower the cost and to minimize performance issues associated with leakage. Also, embodiments can mitigate other pollutants, such as NOx, SOx, CO, HC. Additionally, embodiments can provide a solution suitable for new construction or a retrofit application at the lowest cost.

Embodiments can be operated using the dilute $CO_2$ streams (e.g., 3-11% $CO_2$ by mass) that exist in distributed power to include gas turbines, lean burn piston engines (spark or compression ignited), and rich burn piston engines, for example. Any other source is contemplated herein. In accordance with certain embodiments, a semi-closed cycle (SCC) system, which, at a high level, can include cooled exhaust recirculation with oxygen level management, can be used to increase $CO_2$ concentration at the engine exhaust. Using a carbon capture system in accordance with this disclosure, this cooled exhaust can be chilled, to help remove water, and can be then dehydrated with $CO_2$ and pollutant capture on molecular sieves. When the sieves near capacity, they are regenerated, driving off captured $CO_2$ and other pollutants, by using hot $CO_2$. That hot $CO_2$ can be created via a turbo charger and a heat source, e.g., the exhaust waste heat from the engine. The recirculation within the capture process, and regeneration, can enable concentration of $CO_2$ sufficient for sequestration in a single stage. In embodiments, the $CO_2$ TSA process can be all low pressure, so any pressure vessels that hold the TSA media need only be rated for a few pounds per square inch, and as a result need not be heavy construction. Embodiments enable vessel arrangements that further reduce space, cost, and installation time.

FIG. 1 is a set of example isotherms for a particular molecular sieve. The Y-axis (vertical) indicates the percent loading by mass of water or $CO_2$ in the sieve as a function of partial pressure and temperature. As pressure is increased, or temperature is decreased, the media will adsorb more water or more $CO_2$. Conversely, when pressure is decreased, or temperature is increased, the media will release water or $CO_2$. It can also be seen from FIG. 1 that this sieve has a widely different loading capacity for water relative to $CO_2$ at the same partial pressure temperature combination. The media also has a different affinity for water relative to $CO_2$. As a result of all of these factors, it is possible to use the same media to capture both water and $CO_2$, and to drive those species off at different points in the process. Fundamentally, at equal partial pressure, the capacity for water exceeds that of $CO_2$ in certain embodiments. For example, at 100 hPa and nominally 95-100 C, the capacity for water is in excess of 20%, but for $CO_2$ it is only about 5%. However, the partial pressures of these components are quite different in exhaust, 10% $CO_2$ at 1 bar (1000 hPa) would be a partial pressure of 100 hPa, but the typical water vapor loading of less than 1% is only about 10 hPa. If the exhaust is chilled, then the partial pressure of water will be lower than 10 hPa, since more will condense, and at the same time the capacity for $CO_2$ increases (e.g., at 25 deg C. and 100 hPa, the $CO_2$ capacity is about 15%).

Figure 1A:
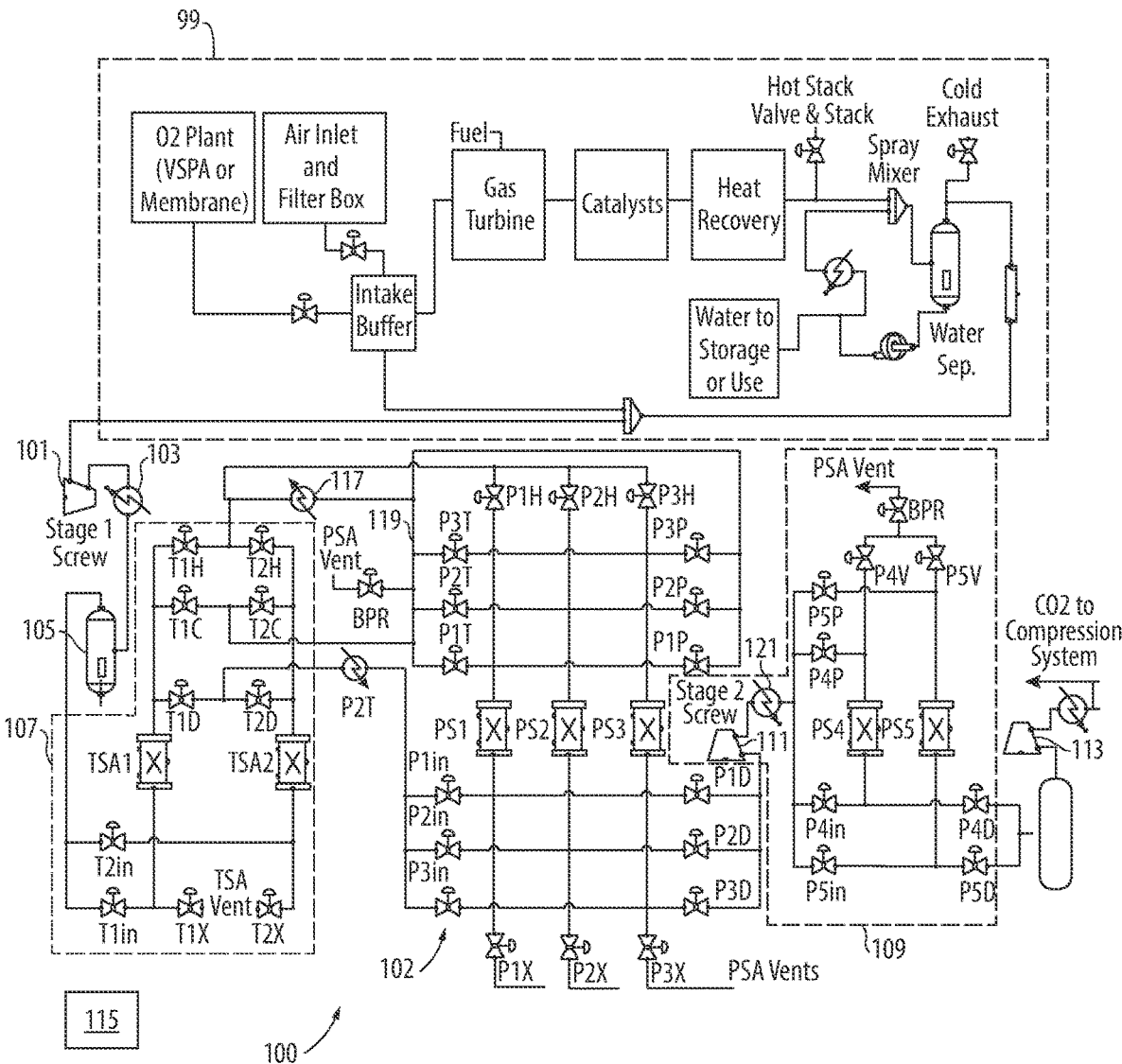
FIG. 1A is a system diagram of an embodiment of a semi-closed cycle engine system having an embodiment of a pressure swing adsorption carbon capture system in accordance with this disclosure, shown utilizing a multi-stage pressure swing adsorption process.

FIG. 1A represents a simplified process flow diagram (PFD) for a mole sieve based carbon capture system 100, applied to a semi-closed cycle engine system 99. The top half of FIG. 1 depicts an embodiment of the semi-closed cycle (SCC) 99, consisting of cooled exhaust recirculation and oxygen augmentation, as applied to a gas turbine engine (however, any suitable engine is contemplated herein). In general, exhaust $CO_2$ concentration can be increased from about 3% to about 6%-21% (e.g., about 2-7 times concentration) using the SCC technique. A portion of the exhaust flow not recirculated, e.g., about 20-50% in the gas turbine application, can enter the capture process via the stage 1 screw (e.g., a compressor 101), which can be compressed to about 50-100 psig in certain embodiments. The screw discharge can be cooled (e.g., at cooler 103), which removes water (e.g., as it condenses out of the gas at a water collector/drain). Then dehydration of the raw $CO_2$ can occur in a dehydration subsystem 107 (e.g., a TSA process e.g., with alumina as the media), in this case shown using two TSA beds, TSA1 and TSA2. Facilities exist, e.g., valves and lines as shown, to heat and cool the bed which is not on the $H_2O$ capture process using the vent gas from the next stage (which is mostly dry Nitrogen). The PS1, PS2, PS3 beds represent a three vessel Pressure Swing Adsorption (PSA) process, using a conventional $CO_2$ capture media, such as 5A or 13X (or any other suitable material for $CO_2$ capture). The $CO_2$ is released during the depressurization process, and it has been shown that unless raw $CO_2$ purity is quite high (e.g., greater than 25%), which is possible via the SCC, that $CO_2$ purity at the discharge of this first stage will not be sufficient for most applications. As a result, a second stage PSA assembly 109, using beds PS4 and PS5 and a second stage 2 screw (a second compressor 111) can be used to get to useful purity. Finally, a third screw compressor (e.g., third compressor 113) can be used as the first stage of the $CO_2$ compression system.

In FIG. 1A, an embodiment of valving (e.g., on/off butterfly valves), lines, connections of lines, flow movers, and other components are shown for the embodiment of the carbon capture system 100. Timing charts for the shown valving disposed with the shown line connections, to operate the carbon capture system 100 (e.g., the primary carbon capture subsystem 102, the second stage 113) in various modes (e.g., capture, production/regeneration, and/or cooling) via the shown lines is shown in FIG. 1B (an embodiment of timing for dehydration subsystem 107 shown in FIG. 2B).

The system 100 can include a control module 115 configured to operate the shown valves in accordance with the timing chart in FIG. 1B. Any other suitable valve control or method is contemplated herein. The control module 115 (and any other control module(s) disclosed herein) can include any suitable hardware (e.g., a programmable logic controller) and/or software module(s) configured to perform any suitable function disclosed herein.

Such embodiments of a system work, have been built, and have reasonable economics, and hence reasonable $CO_2$ capture cost. However, the screw (or blower) power is significant (e.g., due to high compression required to operate PSAs), and secondly, the process of pressurization and depressurization of this media, which captures $CO_2$, also captures things like $N_2$ (albeit at a much lesser rate), and as a result relies on two stages at least to get to a commercial $CO_2$ purity (e.g., about 95%-99% or greater). Furthermore, the SCC process is fully burdened with the exhaust cooling requirements in the embodiment shown, and other than the TSA1 and TSA2 loads (which are relatively small), most of the available waste heat from the engine is often wasted. Lastly, since this process is generally operated above 15 psig, all of the vessels shown in FIG. 1A may need to be ASME Code or equivalent (Pressure Equipment Directive) certified vessels, substantially increasing cost. Such vessels are heavy, due to the high safety factors required of the Codes. Due to their heaviness, they do not support rapid thermal cycling, so the TSA1 and TSA2 vessel are sized consistent with cycle times measured in many hours, not several minutes in certain embodiments.

Embodiments utilizing the PSA system of FIG. 1A can use a substantial amount of horsepower to drive the capture flow (e.g., 20% of engine hp). The embodiment of FIG. 1A can be configured to run one TSA in dehydration mode and one in regeneration mode which allows the process to be a continuous process. As shown, T1D and T2D are the dry gas outlet valves which are upstream of a cooler P2T. This is where outlet flow from the capturing TSA goes (e.g., which is dehydrated gas). The outlet gas can be about 90% $N_2$ and about 10% $CO_2$. This flow flows into the respective PSA (of PS1, PS2, or PS3) that is being operated in capture mode (depending on which of P1in, P2in, or P3in are open). The arrangement shown allows capturing of $CO_2$, production of $CO_2$, and purging of NOx from the PSAs.

Embodiments of TSA purge valves as shown send $N_2$ to the $H_2O$ TSA beds to heat and cool (depending on pathway opened based on T1H, T2H (hot for regeneration) or T1C, T2C (cold for TSA bed cooling)). The P2H and P2X valves can be open to vent hot $N_2$ from heater line. The can be a heater 117 in part of $N_2$ line 119. The flow can be restricted (e.g. with different size pipe) to the hot cleaning valves (P1H, P2H, P3H) to cause smaller portion of flow to divert in hot cleaning mode (e.g., to purge NOx) while still allowing water to be produced/purged in the regenerating TSA.

The embodiment of FIG. 1A can use beds successively until saturated with $CO_2$ (e.g., PS1 with P1in open), and then the control module 115 can operate the valves to switch flow from PS1 to another PSA that is not saturated. When beds are switched, the bed that is saturated can be closed off (e.g., by switching closing P1in if PS1 is the saturated bed) from the dry gas inlet (where P2T is shown). Then, an exit valve (e.g., P1D) can be open and the adsorbed $CO_2$ releases due to stored pressure, which goes to the second stage compressor 111 (e.g., about ⅕ hp of the first stage compressor 101) and second stage 109.

As shown in the timing charts, the PSAs can be operated to switch states on the order of minutes. The TSA bed can be operated to switch states on the order of hours. Embodiments can include a cooler 121 downstream of stage 2 screw (compressor 111). The second pressure swing stage can allow $CO_2$ purity of about 95%-98% for example. As shown, each PSA stage can include a back pressure regulator (BPR) (e.g., 50-60 psi pressure relief valve or controlled valve) valve for venting $N_2$.

Figure 2:
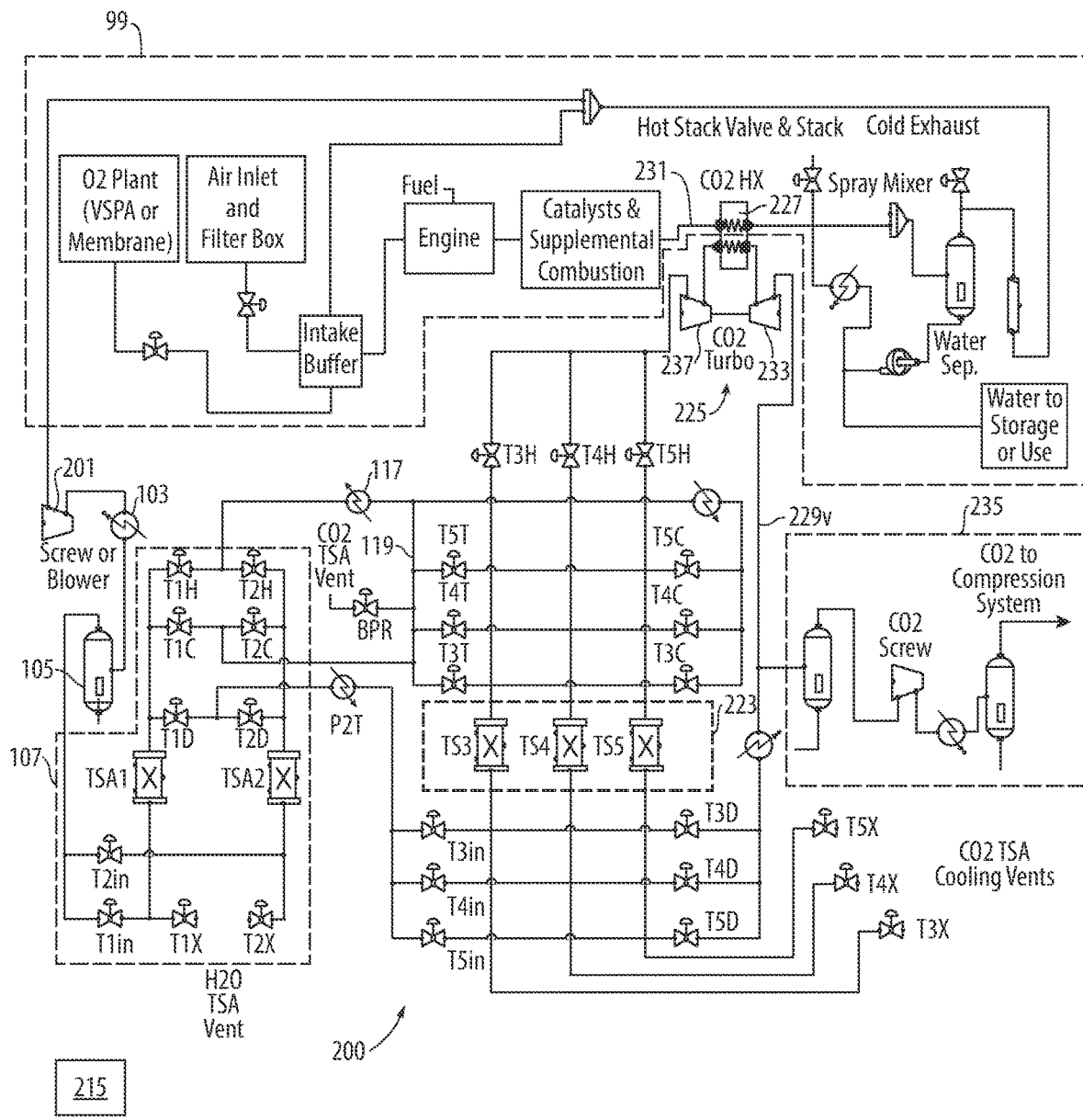
FIG. 2 is a system diagram of an embodiment of a semi-closed cycle engine system having an embodiment of a carbon capture system in accordance with this disclosure, shown utilizing a $CO_2$ thermal swing adsorption (TSA) process and a $CO_2$ recirculation system.

Referring now to FIG. 2, in accordance with at least one aspect of this disclosure, a carbon capture system 200 can include a plurality of $CO_2$ thermal swing adsorption (TSA) beds 223. The plurality of $CO_2$ TSA beds can include at least a first TSA bed (e.g., bed TS3), a second TSA bed (e.g., bed TS4), and a third TSA bed (e.g., TS5) configured to capture $CO_2$ within a capture temperature range and to regenerate the captured $CO_2$ at a regeneration temperature range above the capture temperature range. The carbon capture system 200 can include a plurality of valves (e.g., T3in, T4in, T5in, T3D, T4D, TSD, T3T, T4T, T5T, T3C, T4C, T5C, T3H, T4H, T5H, T3X, T4X, T5X, and BPR) and associated flow paths (lines and connections as shown, e.g., jumpover lines indicated as curved lines over intersecting lines) configured to allow switching operational modes of each of the first, second, and third TSA beds.

Figure 2A:
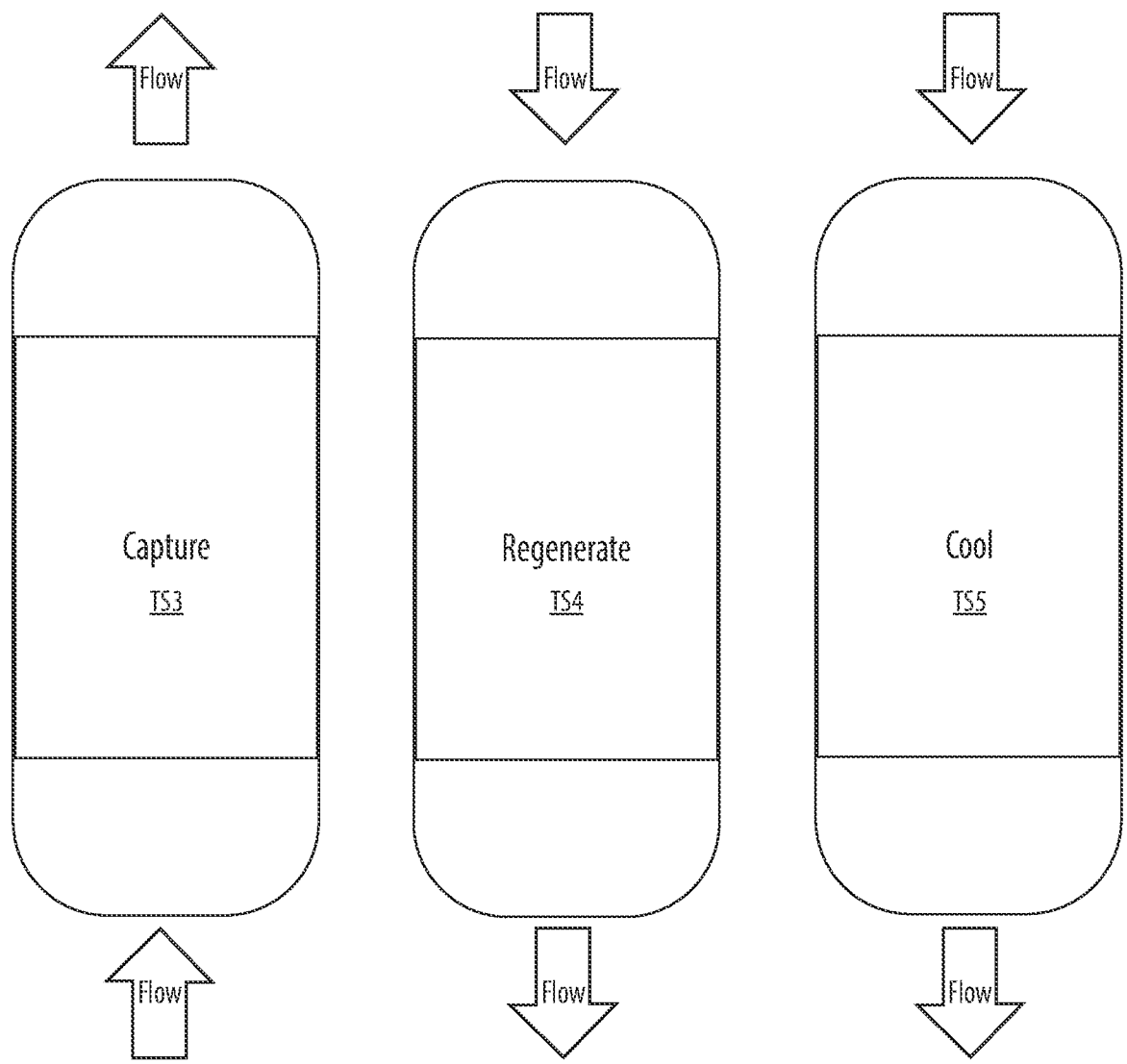
FIG. 2A shows an embodiment of a TSA mole sieve adsorption, regeneration/production (heat), and cooling process, e.g., simultaneously conducted with three TSAs.

Referring additionally to FIGS. 2A and 2B, the carbon capture system 200 can include a control module 215 configured to control the plurality of valves to provide continuous operation such that, simultaneously, at least one of the plurality of TSA beds (e.g., TS3 in FIG. 2A) is operated in a capture mode to remove $CO_2$ from an exhaust flow and to output a nitrogen flow, at least one of the plurality of TSA beds (e.g., TS4 in FIG. 2A) is used in a heated regeneration mode to release $CO_2$ into a production flow, and at least one of the one of the plurality of TSA beds (e.g., TS5 in FIG. 2A) is operated in a cooling mode to be cooled by a cooling flow.

An embodiment of timing charts for both the dehydration process using two TSA beds, and the capture process using the at least three TSA beds is shown in FIG. 2B. The control module 215 can be configured to control the plurality of valves as shown in FIG. 2B.

Similar to the embodiment of FIG. 1A, as shown in FIG. 2, the carbon capture system 200 can be configured to be connected to a semi-closed cycle engine system 99 to receive engine exhaust therefrom. In accordance with at least one aspect of this disclosure, a semi-closed cycle system (e.g., piston, turbine, or otherwise) can include any suitable embodiment of a carbon capture system (e.g., system 200) disclosed herein.

The carbon capture system 200 can include a production stream circulator subsystem 225 selectively connected (via loop line 229 and valves T3H, T4H, T5H, T3D, T4D, T5D) to each TSA bed (e.g., beds TS3, TS4, and TS5) and configured to circulate the production flow ($CO_2$ rich flow) through a respective TSA bed (e.g., TS4 in FIG. 2B) in regeneration mode to regenerate additional $CO_2$ from the TSA bed to increase $CO_2$ concentration in the production flow. The production stream circulator subsystem 225 can include a heat source (e.g., heat exchanger 227 connected to an exhaust line 231 of system 99) configured to add heat to the production flow sufficient to heat the respective TSA bed operated in regeneration mode to within a regeneration temperature range. The production stream circulator subsystem 225 can include a motive source (e.g., compressor 233) configured to move the production flow within the circulator subsystem 225. The production stream circulator subsystem 225 can be in fluid communication with a $CO_2$ output subsystem 235 (e.g., any suitable components configured to output the production flow to a $CO_2$ compression system).

As shown in FIG. 2, the heat source can be a waste heat exchanger 227 configured to be in thermal communication with the exhaust flow downstream of the engine. The motive source can be a compressor 233 connected to a turbine 237. In certain embodiments, the waste heat exchanger 227 can be in fluid communication between the compressor 233 and the turbine 237 such that waste heat drives the turbine 237 to power the compressor 233.

In certain embodiments, the carbon capture system 200 can include a flow mover 201 (e.g., blower, compressor, or fan, screw, or other device, e.g., lower horsepower as compared to the compressor of FIG. 1A) configured to provide motive flow to the exhaust flow to flow through the carbon capture system 200 to a respective TSA bed operated in the capture mode (e.g., TS3 in FIG. 2A). In certain embodiments, similar to the embodiment of FIG. 1A, the carbon capture system 200 can include a dehydration subsystem 107 downstream of the flow mover 201 and upstream of at least one of the first, second, and third TSA beds to remove water (e.g., water vapor and/or steam) upstream of at least one of the first, second, and third TSA beds operating in the capture mode (e.g. TS3).

In certain embodiments, the dehydration subsystem 107 can include at least two dehydration TSAs (e.g., TSA1 and TSA2) and associated valves (e.g., T1in, T2in, T1D, T2D, T1H, T2H, T1C, T2C, T1X, T2X) arranged as shown. The control module 215 can be configured to operate the at least two dehydration TSAs such that a first dehydration TSA (e.g., TSA1) can be operated in a water capture mode to output dry exhaust (the exhaust gas with water vapor removed) to at least one of the plurality of $CO_2$ TSAs 223 (e.g., via cooler P2T and respective inlet valve T3in for TS3 bed). The control module 215 can be configured to operate a second dehydration TSA (e.g., TSA2) can be operated in a water regeneration mode using the nitrogen flow from the plurality of $CO_2$ TSAs 223 (e.g., the flow outlet from TS3 in FIG. 2A) that has been heated (e.g., via heater 117) or in a cooling mode using the nitrogen flow from the plurality of $CO_2$ TSAs that has been cooled, for example.

As shown in the embodiment of a system 200 of FIG. 2, the carbon capture system 200 can utilize TSA beds instead of PSA beds and a hot $CO_2$ flow to purge $CO_2$ from the TSA beds. Such an embodiment can utilize a blower or fan for flow mover 201 because the system can run at much lower pressure, e.g., about 3 psi instead of about 60 psi of certain embodiments utilizing PSAs.

As shown, the TSA arrangement for water removal/dehydration can be the similar or the same as shown in FIG. 1A. The waste heat from engine can add heat to the production flow which can drive a turbo which in turn drives the compressor/fan to provide motive flow to the production flow. Embodiments utilizing TSAs work differently than a PSA arrangement as in FIG. 1A. TSA embodiment use heat to release $CO_2$ from the media. The produced $CO_2$ can then be circulated in a circulator system that adds heat to the gas, e.g., using engine heat that is wasted anyway, which then ports to the opposite side of a respective TSA the $CO_2$ was released from to provide hot $CO_2$ to the TSA to further heat up the TSA to further release even more $CO_2$. This recirculation increases purity of $CO_2$ in the production stream. As shown in FIG. 2, no second stage PSA or other capture system is needed.

Figure 3:
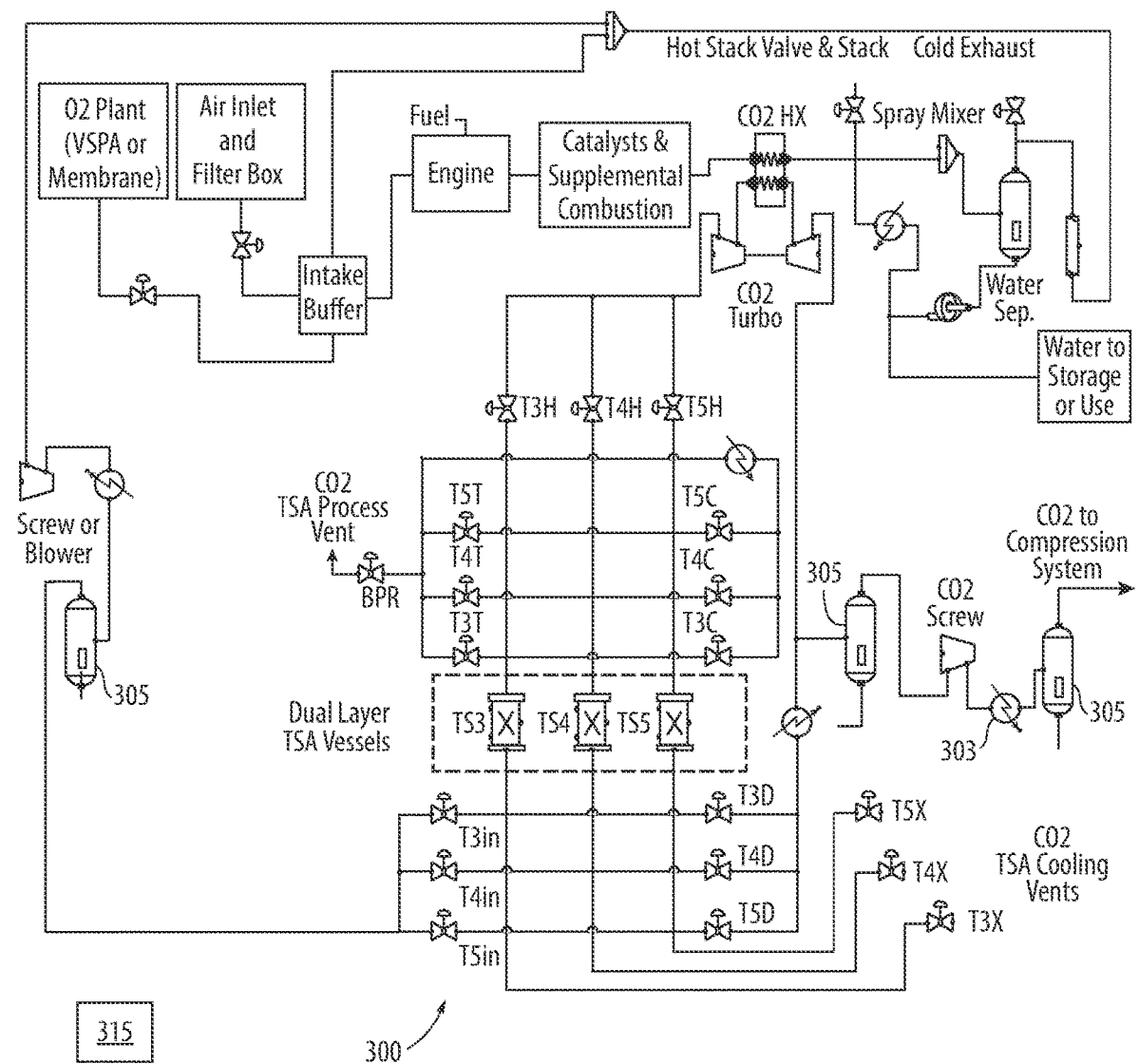
FIG. 3 is a system diagram of an embodiment of a semi-closed cycle engine system having an embodiment of a carbon capture system in accordance with this disclosure, shown utilizing $CO_2$ TSA beds with multi-layer vessels for dehydration and $CO_2$ capture.

In certain embodiments, referring to carbon capture system 300 of FIG. 3, the dehydration subsystem (not specifically shown) can be integrated with each of the first, second, and third TSA beds (each of TS3, TS4, TS5) to remove water and $CO_2$ in the same location. For example, each TSA bed can include $H_2O$ mole sieve media, e.g., sandwiching the $CO_2$ mole sieve media such that each TSA bed can capture both water and $CO_2$.

As shown, the water capture TSAs are integrated physically with the carbon capture TSAs. This eliminates the separate water capture system stage as shown in FIGS. 1A and 2. This physical mixture can be done in any way (e.g., homogeneously, in layers, or any suitable geometry). Such embodiments allow removal of all the dehydration TSA valves and lines, for example. Any residual water can be removed with carbon removal or after because TSA media can handle water content in the exhaust gas whereas PSAs do not work properly with water content. PSA media may not work properly if water content is not removed upstream. As shown, one or more coolers 303 and condensers/separators 305 can be disposed on the production outlet line. Any suitable components of any suitable embodiment (e.g., described above) and/or any suitable control of the valves (e.g., similar to one or more above described embodiments) by control module 315 is contemplated herein.

Figure 4:
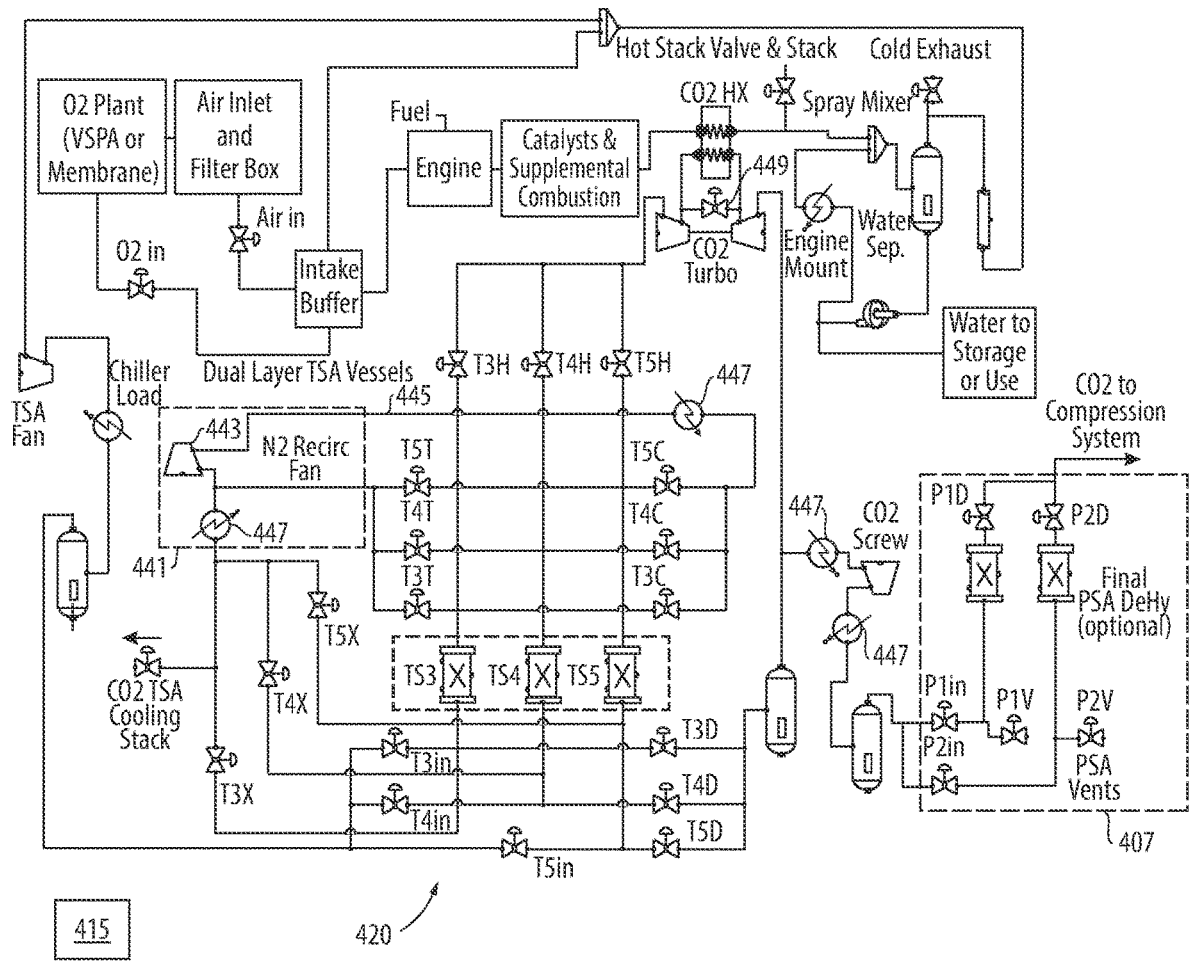
FIG. 4 is a system diagram of an embodiment of a semi-closed cycle engine system having an embodiment of a carbon capture system in accordance with this disclosure, shown utilizing $CO_2$ TSA beds with $N_2$ recirculation for enhanced cooling.

Referring additionally to FIG. 4, in certain embodiments, a carbon capture system 400 can include a nitrogen recirculation system 441 that can have a nitrogen flow mover 443 (e.g., a blower, fan, screw, etc.) configured to recirculate nitrogen output by a respective TSA bed (e.g., TS3 in FIG. 2A) in the capture mode in order to increase cooling effect (by increasing flow speed of the $N_2$ flow) on the first, second, and third TSA beds when operated in the cooling mode. The nitrogen loop 445 can include a cooler 447 disposed thereon to further cool the flow. The exhaust valves T3X, T4X, and T5X can be in fluid communication with the nitrogen loop to allow nitrogen that would otherwise be vented (e.g., if TSA cooling stack valve is open) to circulate in the nitrogen loop 445.

In certain embodiments, the system 400 can include a dehydration subsystem 407 downstream of at least then first, second, and third TSA beds (when operated in production mode) to remove water downstream of at least one of the first, second, and third TSA beds operating in the production mode. For example, a secondary PSA system can be used for dehydration. To aid in timing each mode properly in the combination $H_2O/CO_2$ TSAs, a fan blowing $N_2$ can move the flow quicker and improve cooling. The net flow of $N_2$ can be vented to the cooling stack valve if not being recirculated.

In the embodiment shown in FIG. 4, the $CO_2$ compressor/turbine system can also have a valve 449 and thermostat (e.g., connected to the control module 415) configured to keep the recirculated $CO_2$ gas from being unnecessarily hot to reduce cooling need. It is contemplated that this and/or the nitrogen recirculation system 441 can be implemented in any embodiment disclosed herein. Any suitable components of any suitable embodiment (e.g., described above) and/or any suitable control of the valves (e.g., similar to one or more above described embodiments) by control module 415 is contemplated herein.

Figure 5:
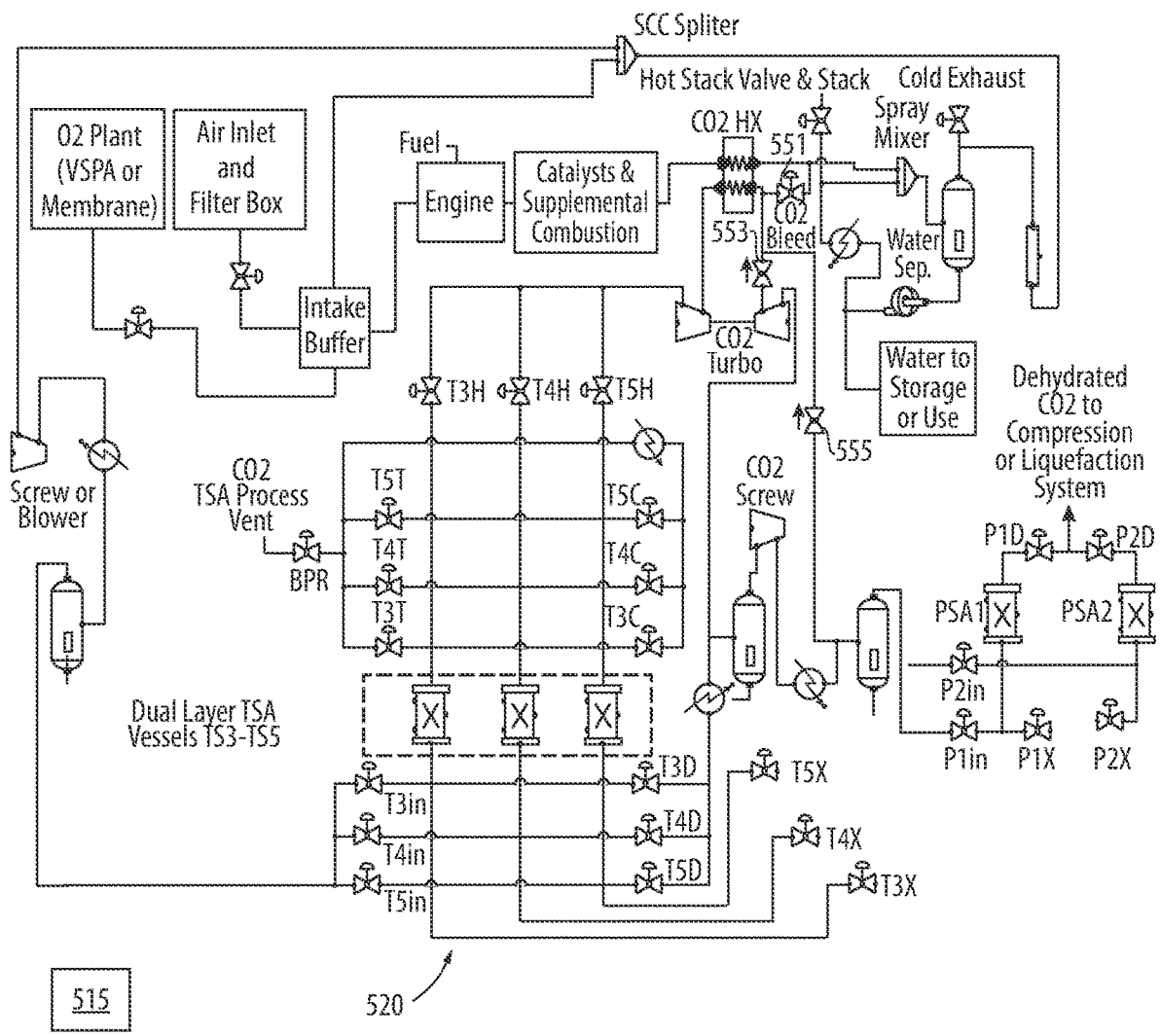
FIG. 5 is a system diagram of an embodiment of a semi-closed cycle engine system having an embodiment of a carbon capture system in accordance with this disclosure, shown utilizing $CO_2$ TSA beds with a gas turbo start and $CO_2$ recirculation to the semi-closed cycle engine system (e.g., to the exhaust)

Referring to FIG. 5, a carbon capture system 500 can include a $CO_2$ bleed 551 to increase concentration of $CO_2$ in exhaust gas, e.g., slightly, to improve concentration at the inlet to the system 500, which can improve functioning and timing of the TSAs as well as ultimate concentration at output. Also, as shown in FIG. 5, the system 500 can include a start-up valve 553 (e.g., a check valve or other suitable valve) that opens when the compressor starts spinning. Certain embodiments can also have a valve 555 to provide starter motive flow to the $CO_2$ compressor. Once the compressor starts spinning and develops sufficient flow/pressure, the valve 555 can close, and valve 553 opens.

The embodiment shown in FIG. 5 can be otherwise similar to the embodiment of FIG. 3, but including a $CO_2$ recirculation compressor start via a gas injection, and a $CO_2$ bleed to exhaust to further concentrate $CO_2$. Any suitable components of any suitable embodiment (e.g., described above) and/or any suitable control of the valves (e.g., similar to one or more above described embodiments) by control module 515 is contemplated herein.

Figure 6:
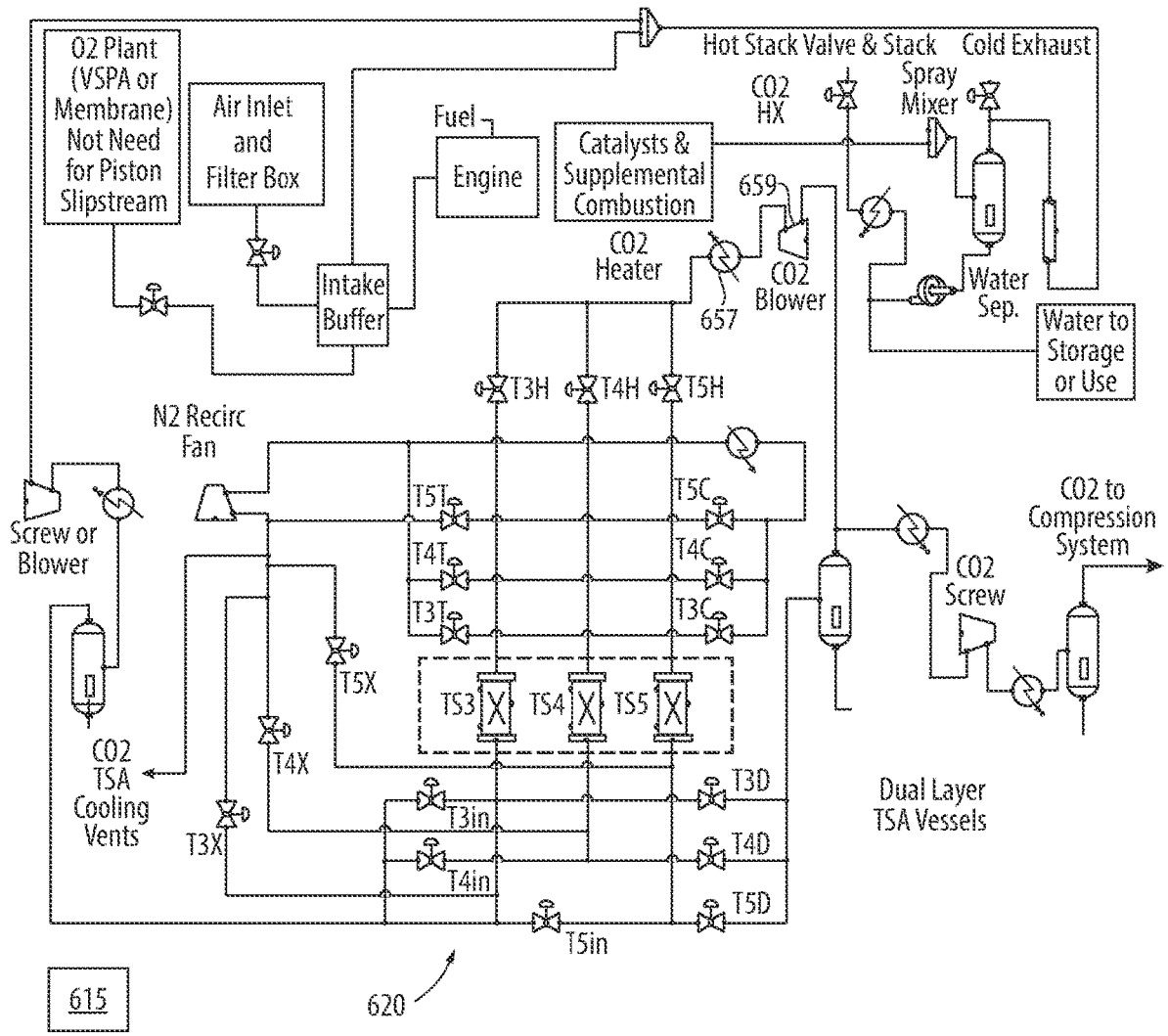
FIG. 6 is a system diagram of an embodiment of a semi-closed cycle engine system having an embodiment of a carbon capture system in accordance with this disclosure, shown utilizing $CO_2$ TSA beds with a mechanical $CO_2$ blower and supplemental $CO_2$ heating.

Referring to FIG. 6, the system 600 can include an added heater 657 for ensuring the recirculated $CO_2$ flow is suitably hot for TSA regeneration. Also, this embodiment is shown having a blower 659 (e.g., partially electrically driven, or otherwise) instead of an engine heat driven turbo (or in addition to in certain embodiments). This embodiment is also shown including a nitrogen recirculation system similar to the embodiment of FIG. 4. Any suitable components of any suitable embodiment (e.g., described above) and/or any suitable control of the valves (e.g., similar to one or more above described embodiments) by control module 615 is contemplated herein.

Figure 7:
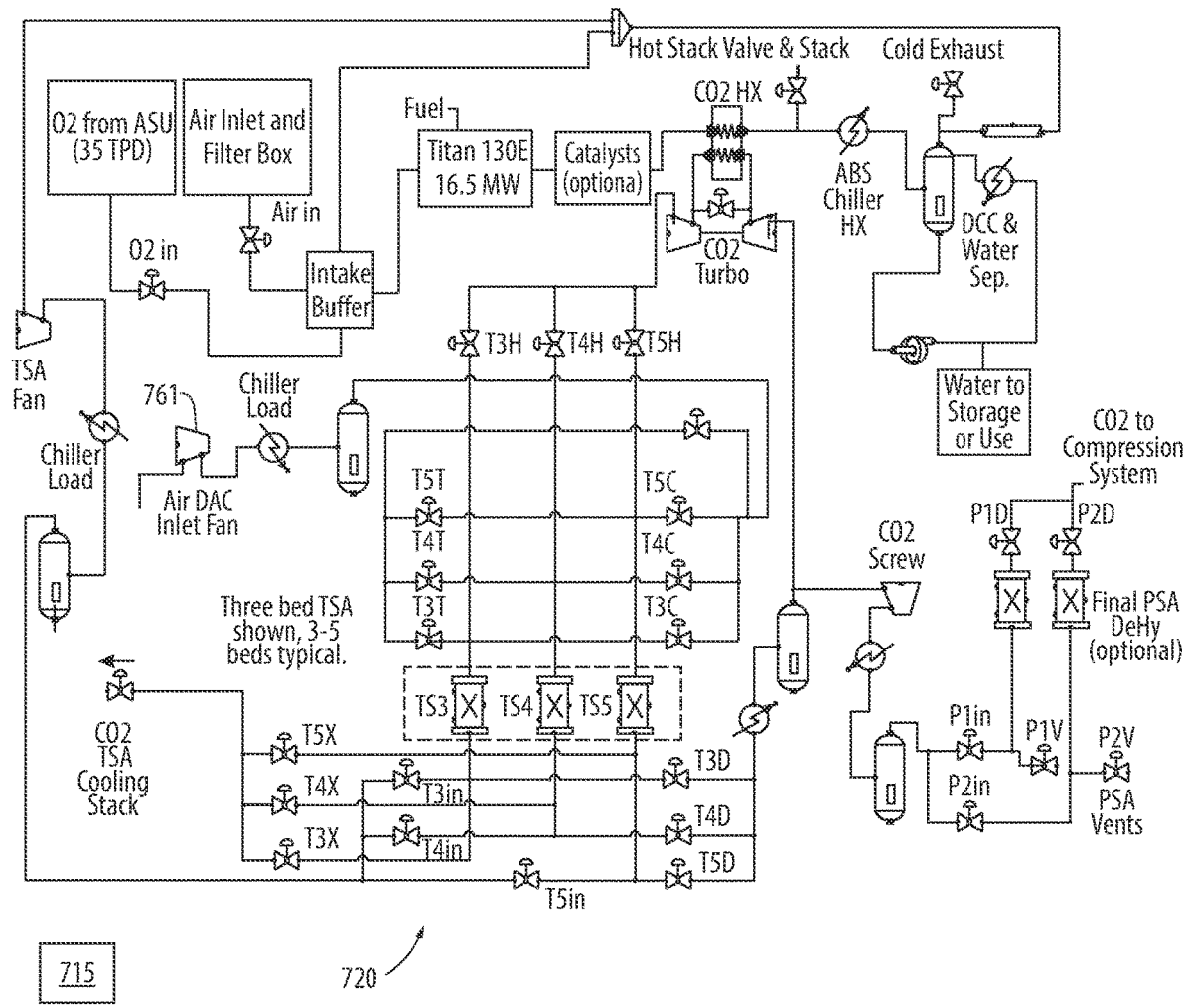
FIG. 7 is a system diagram of an embodiment of a semi-closed cycle engine system having an embodiment of a carbon capture system in accordance with this disclosure, shown utilizing $CO_2$ TSA beds with air cooling and direct air $CO_2$ capture.

Referring to FIG. 7, the system 700 can have an air fan 761 instead of an $N_2$ recirculation system. This can eliminate a big heat exchanger and can use the existing chiller to cool and condense water out of air. An added benefit is that direct air capture of $CO_2$ also can happen. The horsepower required for the air fan can be lower, and the cooler on the cold nitrogen line can be removed. The chiller load as shown is not an added heat exchanger source but is the existing chiller that allows use of a small heat exchange for the air. Water will drop out of the gas after the chiller load, and mostly dry air can be output. The air can mix with $N_2$ in the system (output by the capturing TSA) and make the mixture essentially a dry $N_2$ flow.

Embodiments such as that in FIG. 7 allow for direct air cooling and direct air carbon capture, use of the chiller to reduce water adsorption load, and a counter flow SCC quench system. Any suitable components of any suitable embodiment (e.g., described above) and/or any suitable control of the valves (e.g., similar to one or more above described embodiments) by control module 715 is contemplated herein.

Figure 8:
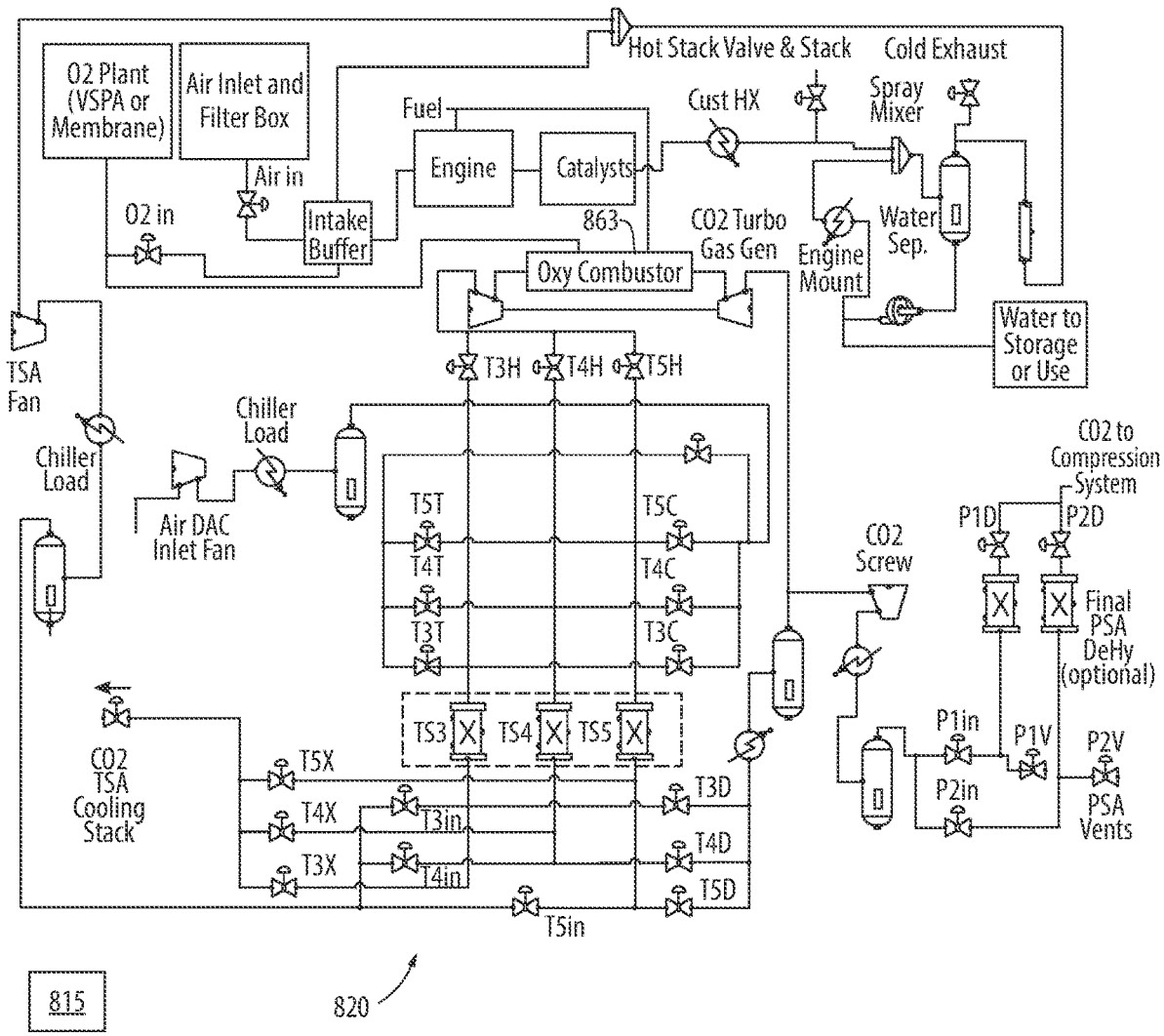
FIG. 8 is a system diagram of an embodiment of a semi-closed cycle engine system having an embodiment of a carbon capture system in accordance with this disclosure, shown utilizing $CO_2$ TSA beds and a direct fired $CO_2$ turbo for the $CO_2$ recirculation system.

Referring to FIG. 8, in this embodiment of a system 800, fuel can be burned to create hot $CO_2$ using an existing oxygen supply of the SCC. By using $O_2$ as the oxidant, unwanted introduction of $N_2$ is avoided. Such embodiments can be useful for retrofit, for example. This is embodiment allows for heating flow without drawing heat from the engine or using an electric heater as in previous embodiments.

The system 800 utilizes a fired $CO_2$ turbo where the heat source is an oxygen burner 863. The burner 863 can be in only thermal communication with the production flow recirculation loop, for example, and the combustion products from the burner can be output to the engine or engine exhaust for the system 800 to process with the exhaust. In certain embodiments, the exhaust from the oxygen burner 863 can be in fluid communication with the recirculation loop (e.g., the turbine) for example. Any suitable similar components of any suitable embodiment (e.g., described above) and/or any suitable control of the valves (e.g., similar to one or more above described embodiments) by control module 815 is contemplated herein.

Figure 9:
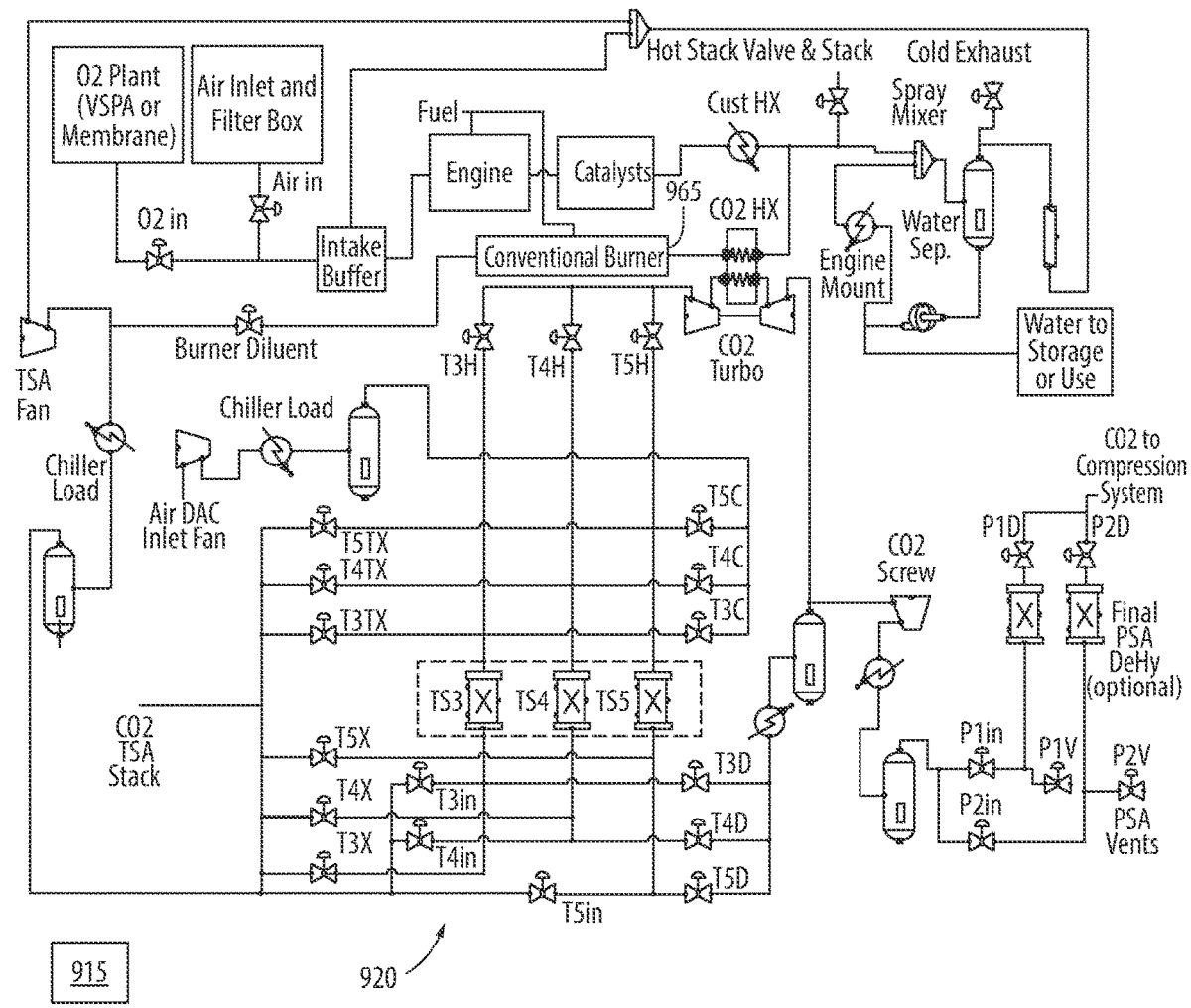
FIG. 9 is a system diagram of an embodiment of a semi-closed cycle engine system having an embodiment of a carbon capture system in accordance with this disclosure, shown utilizing $CO_2$ TSA beds and a burner augmented heat exchanger for the $CO_2$ recirculation system.

Referring to FIG. 9, a system 900 can include a conventional burner 965 can be added to add heat to the exhaust heat exchanger 227 of FIG. 2, for example. Also, the shown embodiment allows direct venting of $N_2$ gas from capture and also air from cooling if desired (e.g., via valves T3TX, T4TX, T5TX). The embodiment of FIG. 9 is shown not including $N_2$ recirculation as shown in FIG. 7.

Embodiments can utilize a burner augmented $CO_2$ turbo heat exchanger. The burner exhaust can be about 11% $CO_2$ mixed with SCC exhaust, for example. Any suitable similar components of any suitable embodiment (e.g., described above) and/or any suitable control of the valves (e.g., similar to one or more above described embodiments) by control module 915 is contemplated herein. Any suitable combinations of any suitable portions of any suitable embodiments are contemplated herein.

In accordance with at least one aspect of this disclosure, a carbon capture system can include a thermal swing adsorption (TSA) bed configured to capture $CO_2$ within a capture temperature range and to regenerate the captured $CO_2$ at a regeneration temperature range above the capture temperature range, and a production stream circulator subsystem selectively connected to the TSA bed and configured to circulate a heated production flow through a thermal swing adsorption (TSA) bed to regenerate additional $CO_2$ from the TSA bed to increase $CO_2$ concentration in the production flow. The production stream circulator subsystem can be any suitable embodiments of a production stream circulator, e.g., as disclosed above.

In accordance with at least one aspect of this disclosure, a method can include recirculating heated $CO_2$ rich production flow to a $CO_2$ TSA bed to increase $CO_2$ concentration in a production mode of the $CO_2$ TSA bed. The method can include using engine waste heat to heat the heated $CO_2$ rich production flow and to provide motive force to the heated $CO_2$ rich production flow. In certain embodiments, the method can include recirculating nitrogen to cool the TSA bed in a cooling mode. The method can include any other suitable method(s) and/or portion(s) thereof.

Figure 10:
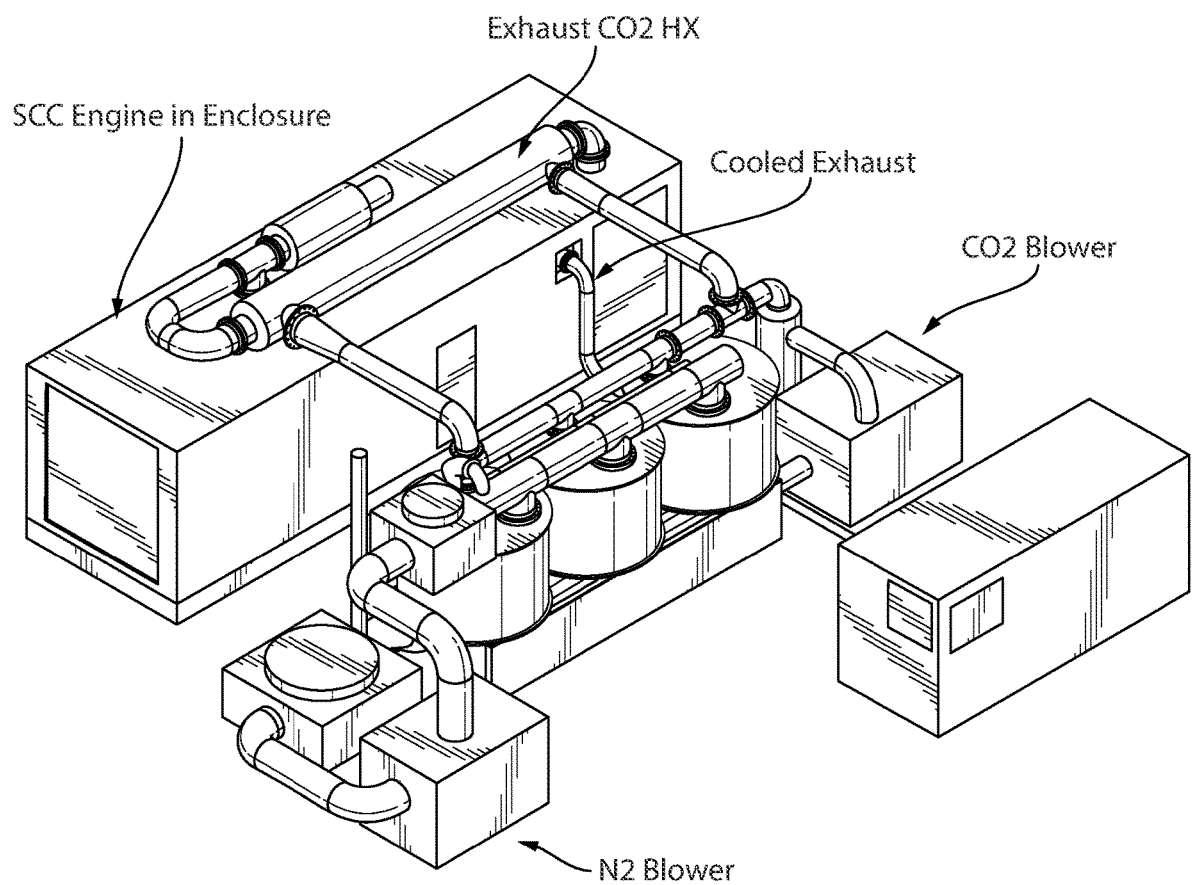
FIG. 10 is an embodiment of a $CO_2$ TSA bed arrangement (e.g., for a 1 MW piston engine system) of the system as shown in FIG. 2, for example.
Figure 11A:
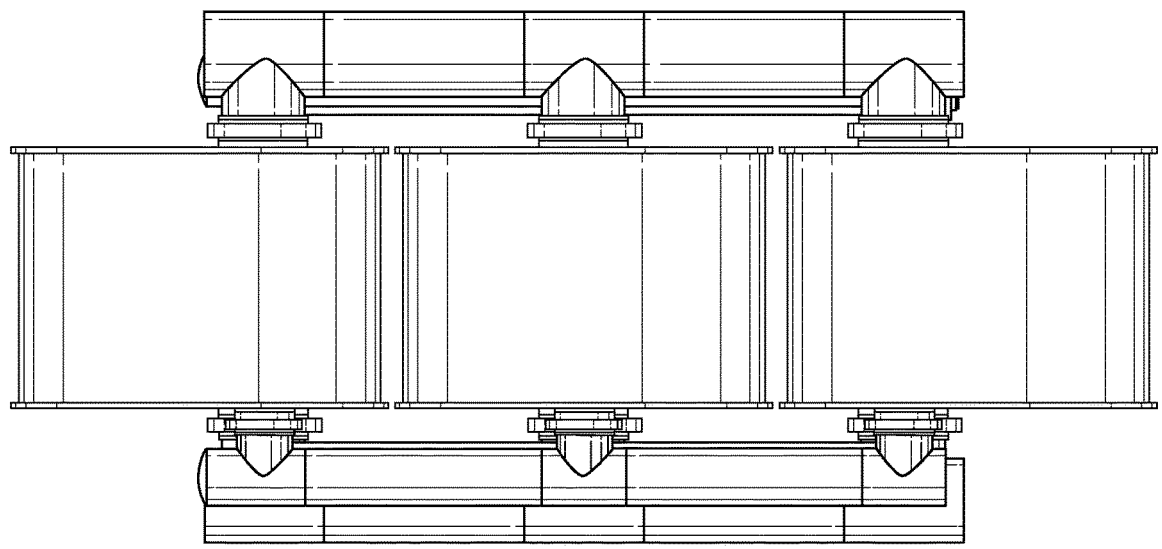
FIG. 11A is side view of a $CO_2$ TSA bed arrangement of the embodiment of FIG. 3, showing an example mechanical arrangement of three separate layered TSA vessels.
Figure 11B:
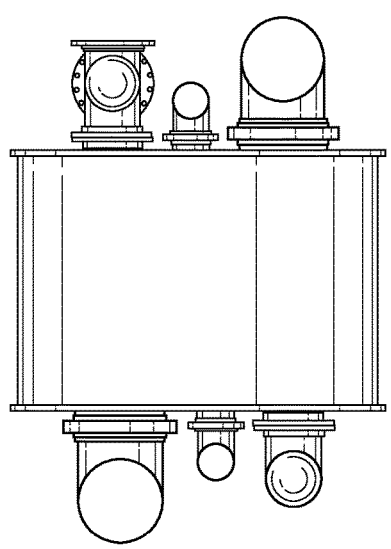
FIG. 11B is and orthogonal side view of the embodiment of FIG. 11A.
Figure 11C:
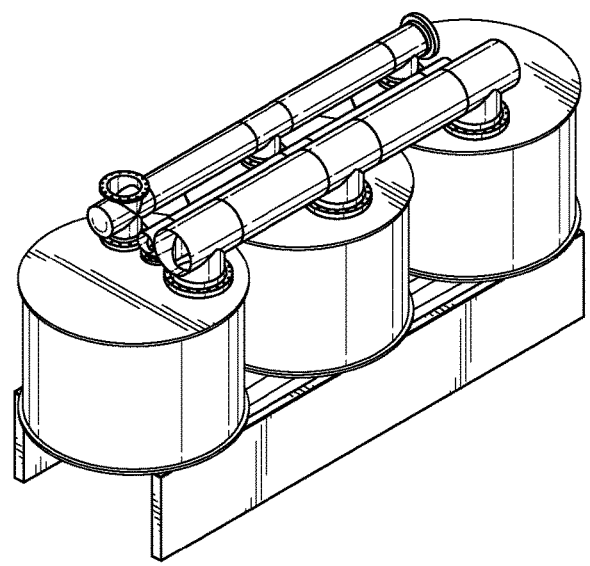
FIG. 11C is perspective view of the embodiment of FIG. 11A.

FIG. 10 is an embodiment of a $CO_2$ TSA bed arrangement (e.g., for a 1 MW piston engine system) of the system as shown in FIG. 2, for example. FIG. 11A is side view of a $CO_2$ TSA bed arrangement of the embodiment of FIG. 3, showing an example mechanical arrangement of three separate layered TSA vessels. FIG. 11B is and orthogonal side view of the embodiment of FIG. 11A. FIG. 11C is perspective view of the embodiment of FIG. 11A. FIGS. 11A-11C show an embodiments of layered TSA vessels. The top headers can be for hot $CO_2$ inlet (prior to regeneration), dry $N_2$ outlet (after adsorption), and dry $N_2$ inlet (for cooling). The bottom headers can be for exhaust inlet (for adsorption), $CO_2$ outlet (after regeneration), and $N_2$ outlet (post cooling).

Figure 12:
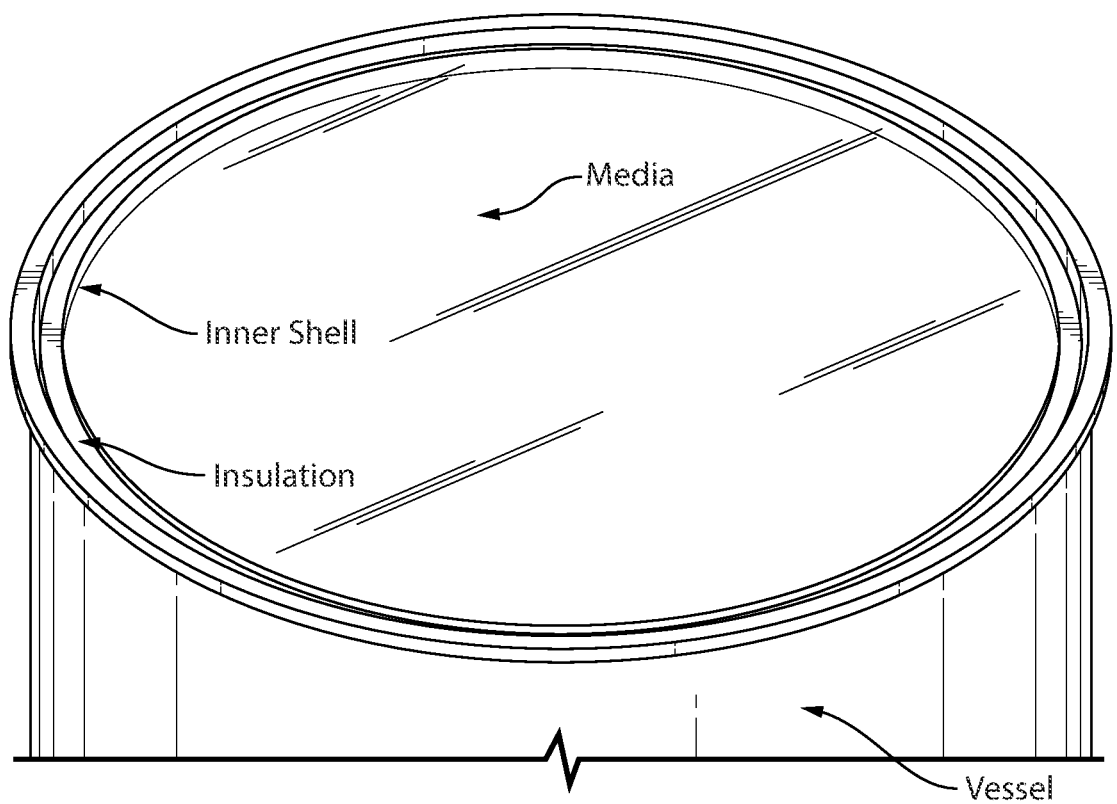
FIG. 12 is a partial perspective view of an embodiment of a $CO_2$ TSA vessel construction having an internal liner and insulation.

FIG. 12 is a partial perspective view of an embodiment of a $CO_2$ TSA vessel construction having an internal liner and insulation. FIG. 12 shows a single vessel, lid removed. The vessel can be an internally insulated "pressure vessel" with a thin wall stainless steel liner, a mole sieve media, an inner shell, and insulation. An insulation gap can prevents heat exchange with the steel vessel.

Figure 13:
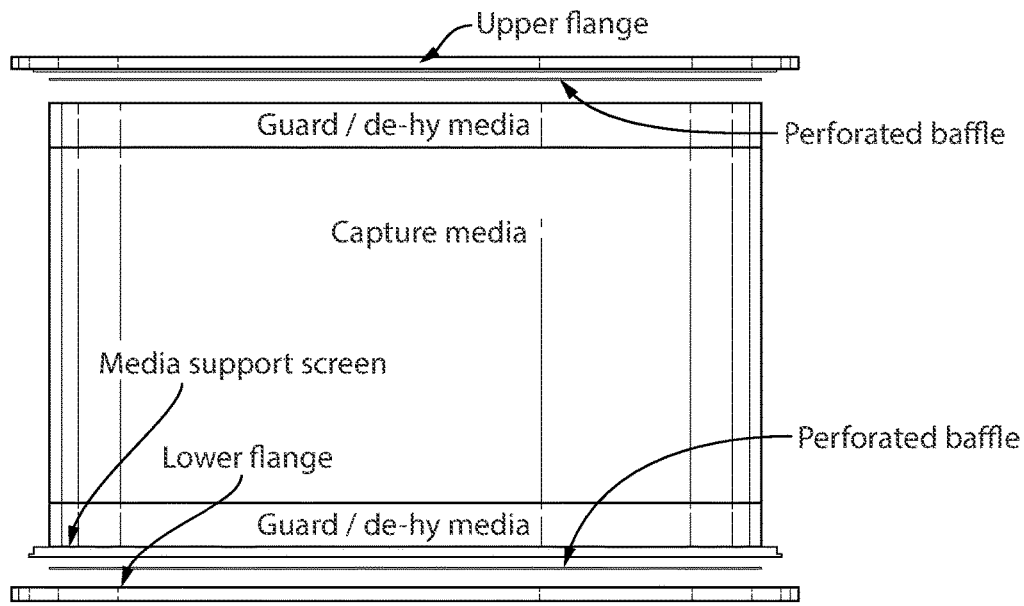
FIG. 13 is a cross-sectional view of an embodiment of a $CO_2$ TSA having integrated dehydration TSA media, e.g., for the embodiment of FIG. 3, showing the vessel, liners, and baffle arrangement.

FIG. 13 is a cross-sectional view of an embodiment of a $CO_2$ TSA having integrated dehydration TSA media, e.g., for the embodiment of FIG. 3, showing the vessel, liners, and baffle arrangement. The outer shell, insulation, and inner liner are hidden in FIG. 13. As shown, the "sandwich" structure can include an upper flange, a perforated baffle, a guard/de-hydration media, a $CO_2$ capture media, another guard/de-hydration media, a media support screen, a perforated baffle, and a lower flange.

Figure 13A:
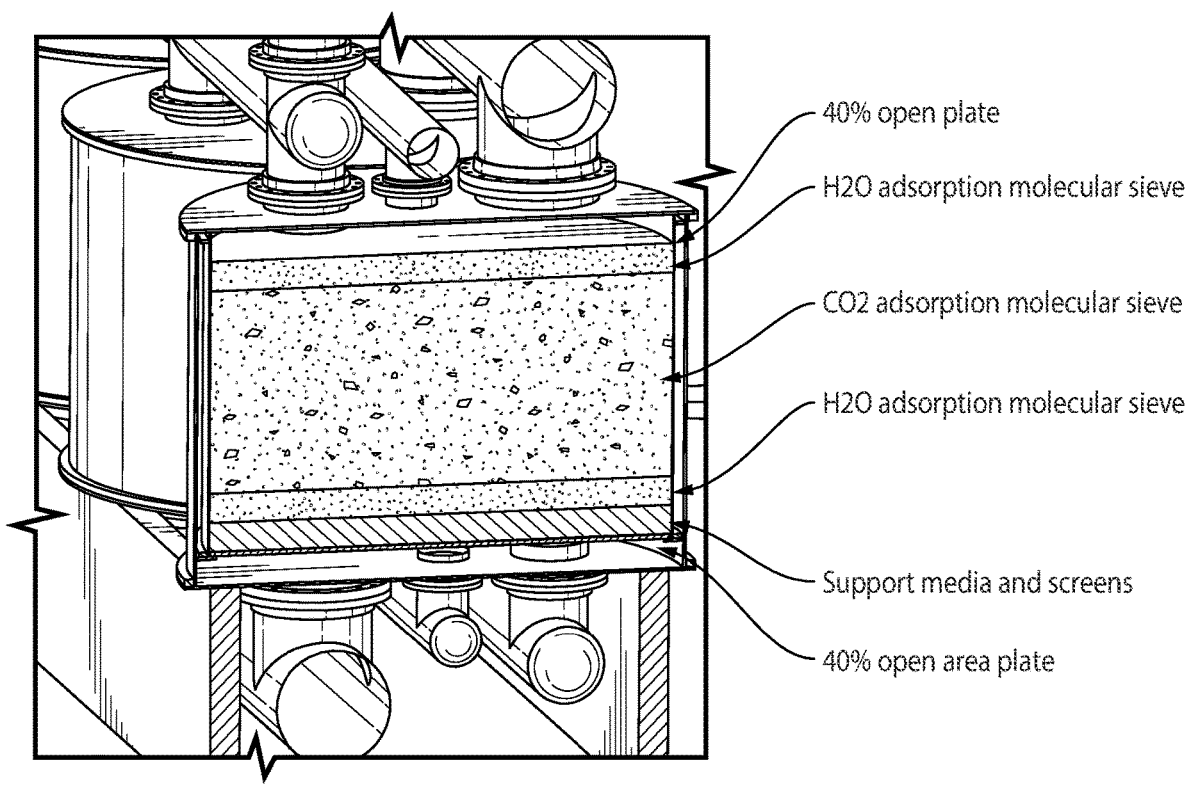
FIG. 13A shows a perspective cross-sectional view of the embodiment of FIG. 13, shown integrated into the embodiment of FIG. 10.

FIG. 13A shows a perspective cross-sectional view of the embodiment of FIG. 13, shown integrated into the embodiment of FIG. 10. As shown, the embodiment of a sandwich structure, e.g., as shown in FIG. 13, can include an about 40% open plate, an $H_2O$ adsorption molecular sieve, $CO_2$ adsorption molecular sieve, another $H_2O$ adsorption molecular sieve, support media and screens, and another about 40% open area plate. Any other suitable arrangement and sizes are contemplated herein.

Figure 13B:
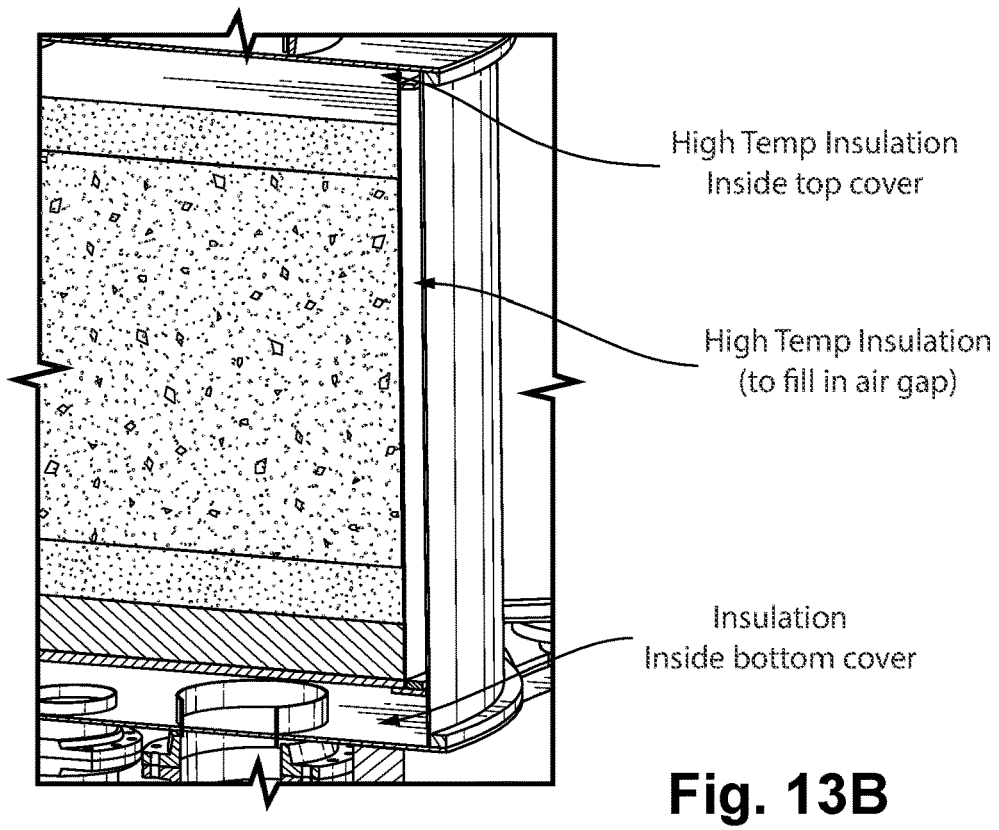
FIG. 13B shows a partial perspective cross-sectional view of the embodiment of FIG. 13A.
Figure 13C:
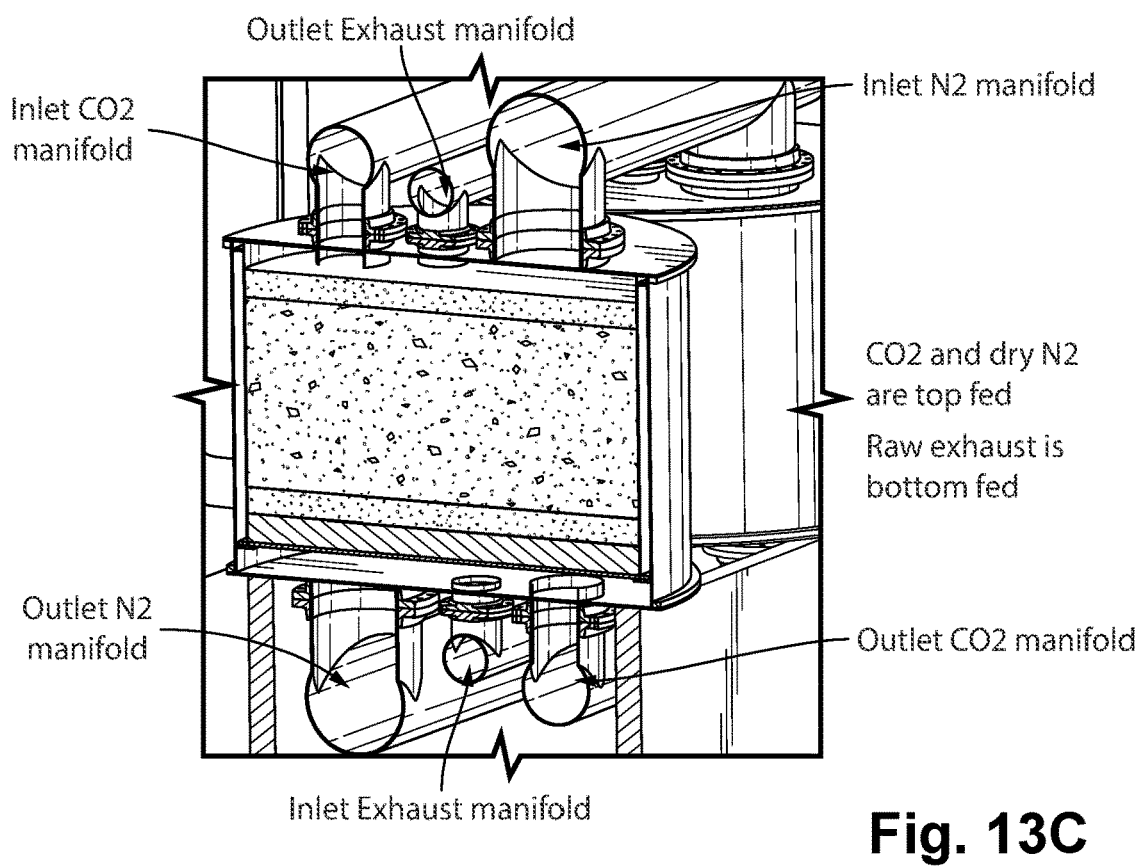
FIG. 13C shows a perspective cross-sectional view of the embodiment of FIG. 13B.

FIG. 13B shows a partial perspective cross-sectional view of the embodiment of FIG. 13A. As indicated, the structure can include a high temp insulation inside the top cover, a high temp insulation (to fill in air gap) in a radial gap, and insulation inside a bottom cover. FIG. 13C shows a perspective cross-sectional view of the embodiment of FIG. 13B. $CO_2$ and dry $N_2$ can be top fed. Raw exhausts can be bottom fed.

Figure 13D:
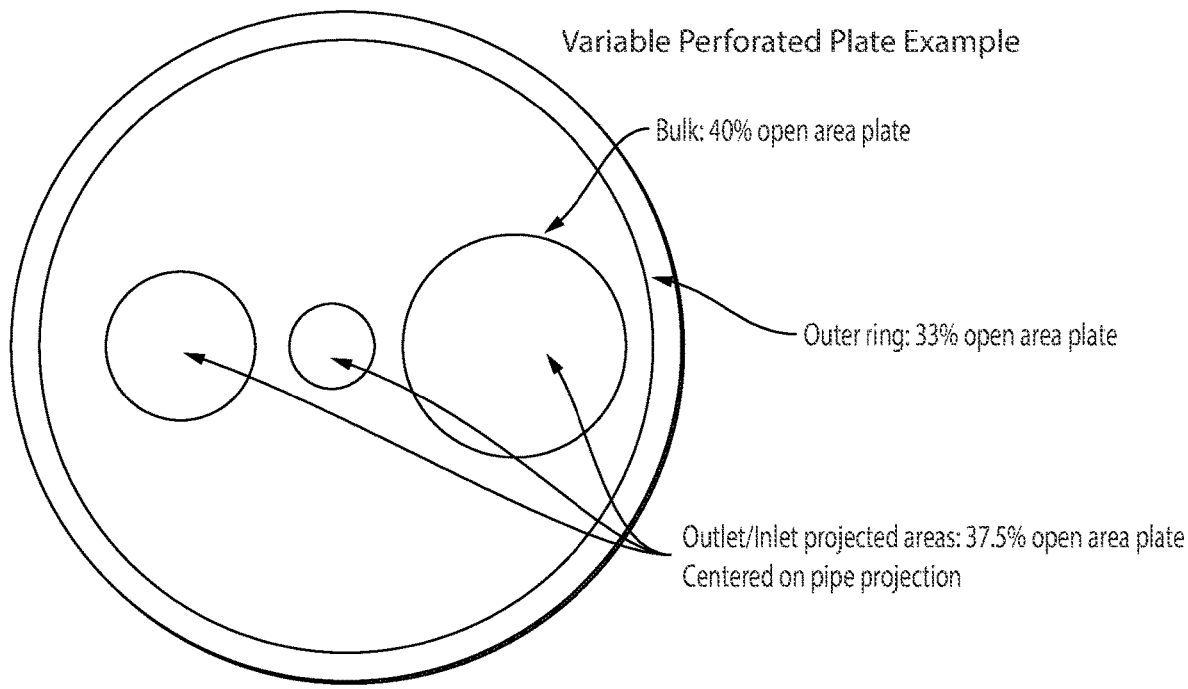
FIG. 13D shows a schematic plan view of an embodiment of a variable perforated baffle plate.

FIG. 13D shows a schematic plan view of an embodiment of a variable perforated baffle plate. A variable perforated plate example is shown having an about 40% open area plate, an outer ring having a 33% open area plate, and outlet/inlet projected areas of about 37.5% open area plate centered on pipe projection.

Figure 13E:
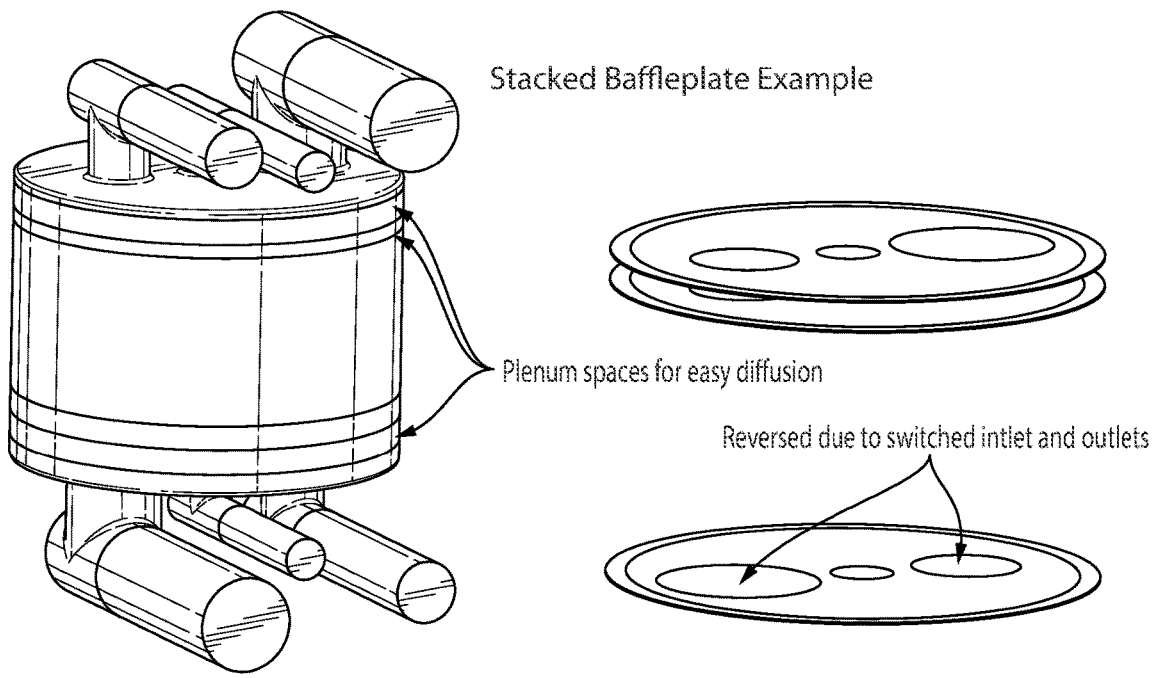
FIG. 13E shows a schematic diagram of the embodiment of FIG. 13, shown illustrating an embodiment of a baffle plate arrangement

FIG. 13E shows a schematic diagram of the embodiment of FIG. 13, shown illustrating an embodiment of a baffle plate arrangement. FIG. 13E shows a stacked baffleplate example having plenum spaces for easy diffusion and reversed to switched inlet and outlet locations.

Figure 14:
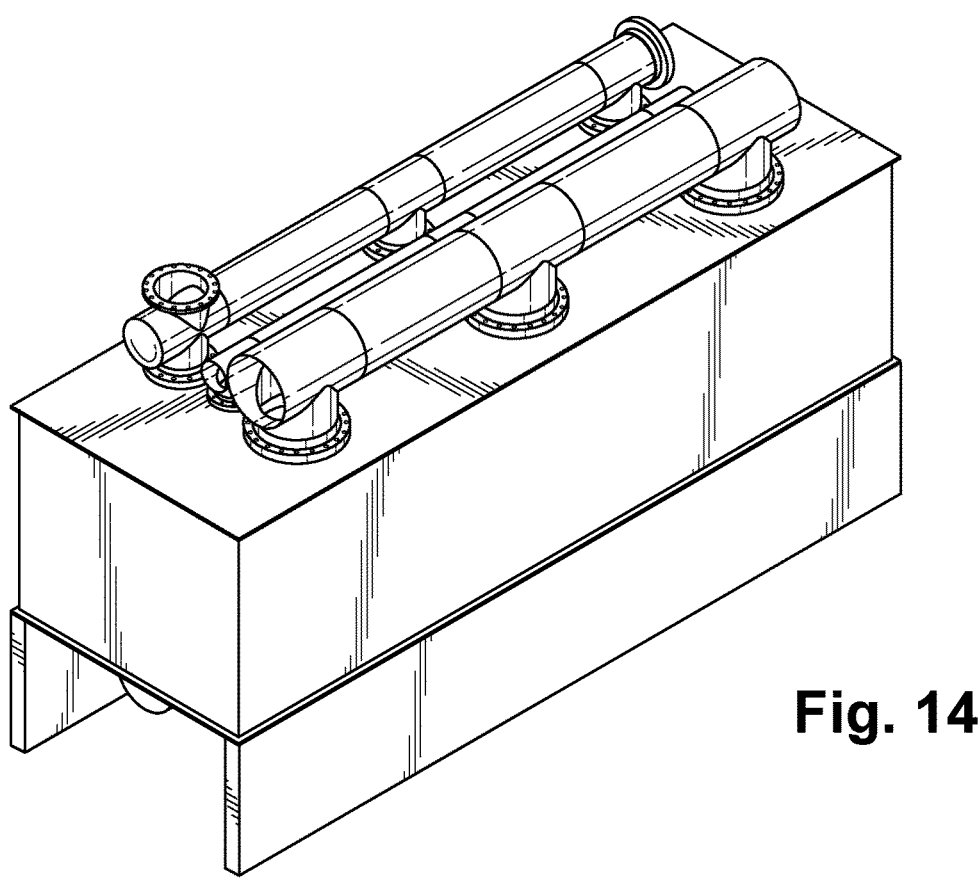
FIG. 14 shows a perspective view of an embodiment of a $CO_2$ TSA single vessel construction having separate compartments.
Figure 14A:
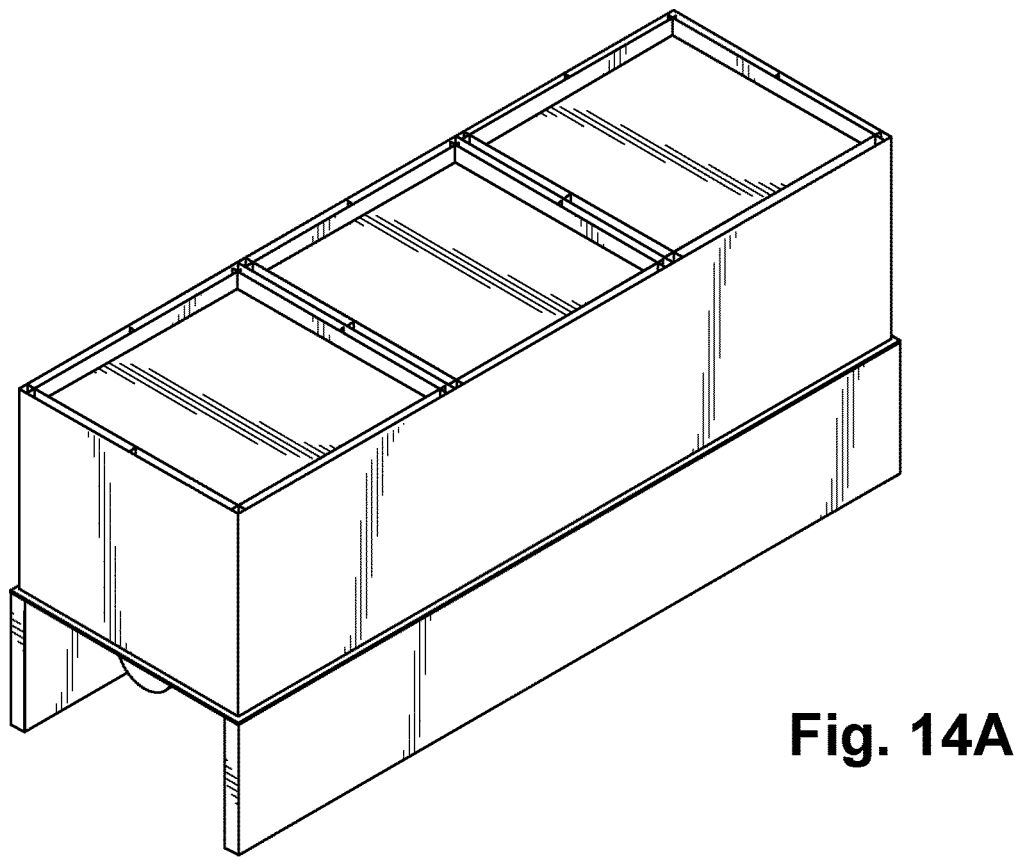
FIG. 14A shows a perspective view of the embodiment of FIG. 14, shown with top components removed.
Figure 14B:
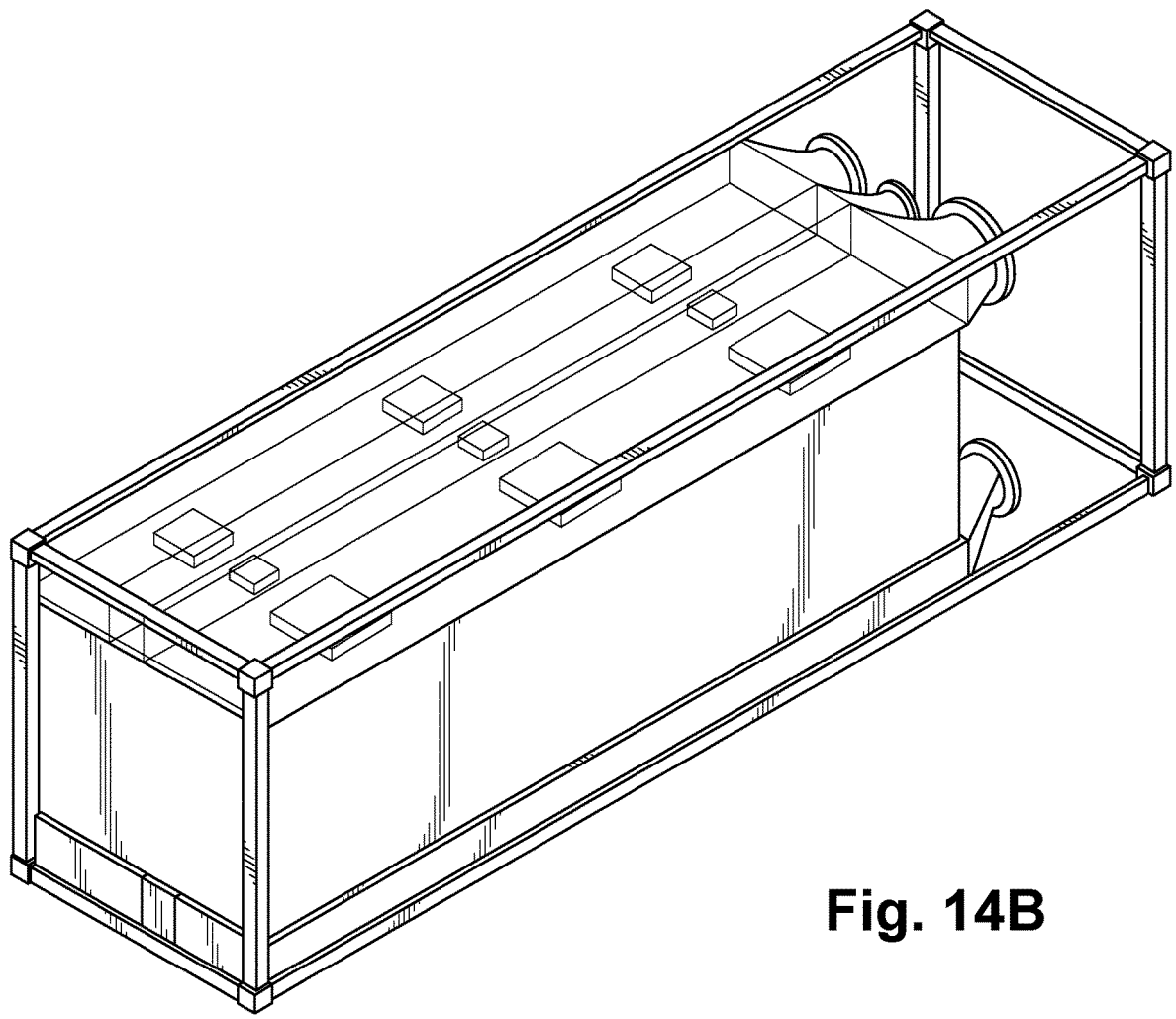
FIG. 14B shows a perspective schematic view of the embodiment of FIG. 14A, shown having integrated duct work.
Figure 14C:
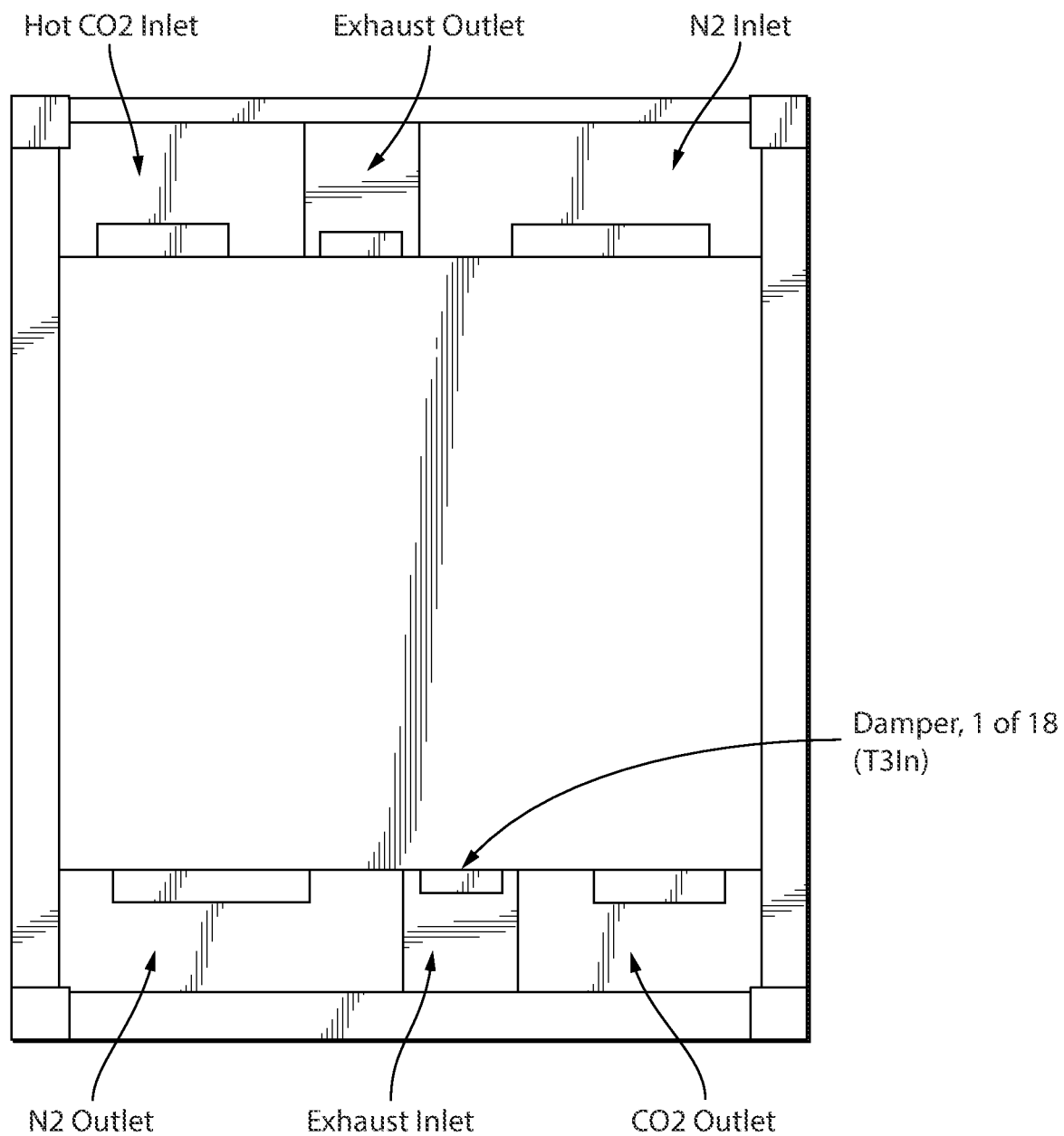
FIG. 14C shows a cross-section of the embodiment of FIG. 14B, wherein the top and bottom ducts are shown transparent so that location of dampers is visible.
Figure 14D:
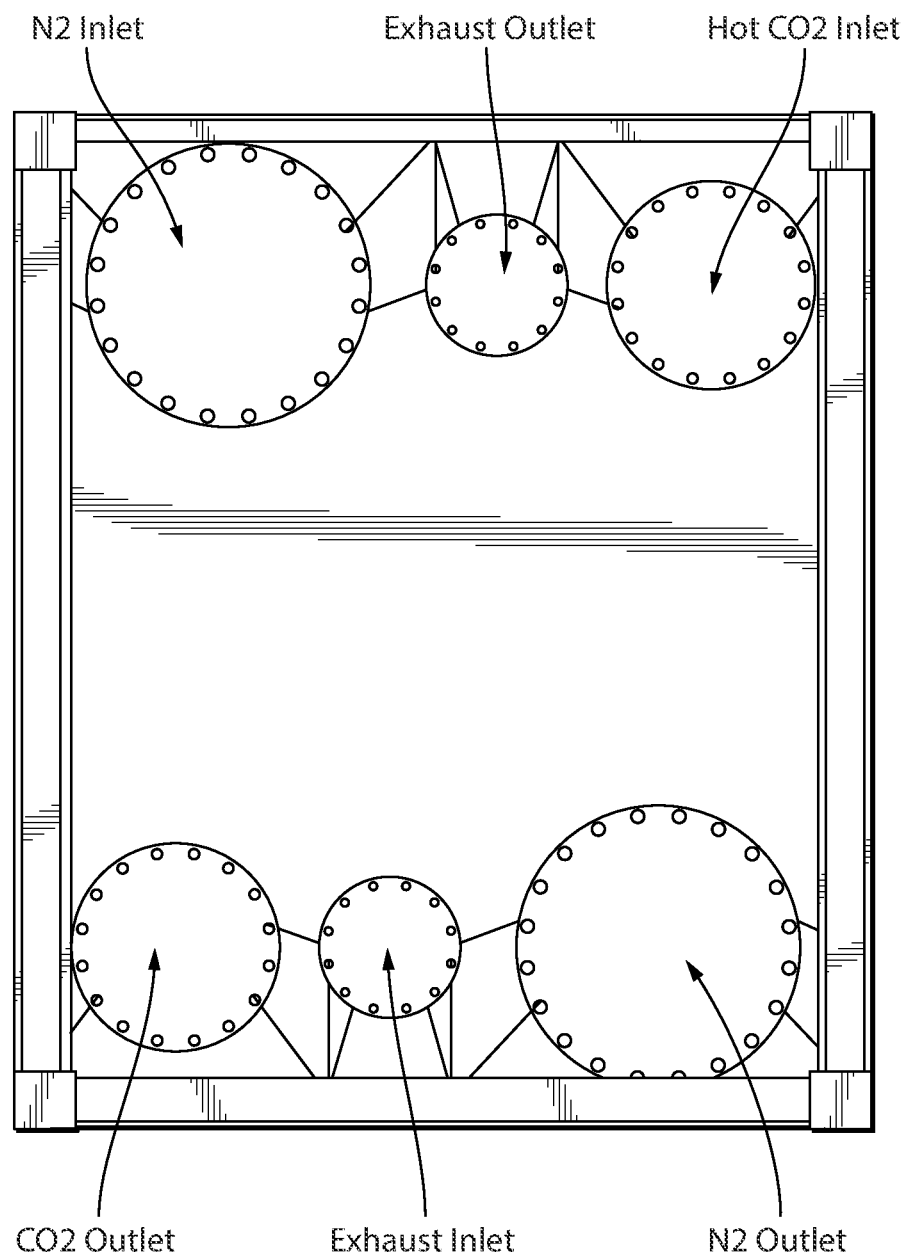
FIG. 14D shows an end elevation view of the embodiment of FIG. 14C.

FIG. 14 shows a perspective view of an embodiment of a $CO_2$ TSA single vessel construction having separate compartments. FIG. 14A shows a perspective view of the embodiment of FIG. 14, shown with top components removed. FIG. 14B shows a perspective schematic view of the embodiment of FIG. 14A, shown having integrated duct work. FIG. 14C shows a cross-section of the embodiment of FIG. 14B, wherein the top and bottom ducts are shown transparent so that location of dampers is visible. FIG. 14D shows an end elevation view of the embodiment of FIG. 14C.

As shown, instead of three cylindrical vessels, certain embodiments can have one large vessel with baffles. Valves, while not shown, can be placed right at the flange where the pipes meet. Embodiments can provide multiple compartments in a single vessel. Embodiments can have no significant pressure or pressure differences due to use of the TSAs, and a flat sided design is possible with minimal reinforcement. Minor leakage between compartments does not significantly impact the process. Production is at slightly higher pressure than the rest of the process, and no special high temperature or complex seals are required.

The embodiment of FIGS. 14B-14D eliminates complex ducting and fits the whole assembly into an ISO container (e.g., for ease of shipping). Ducts do not need to be perfectly sealed due to low pressure, and that leaking does not meaningfully affect performance. Cheaper metals and material can be used.

Figure 15A:
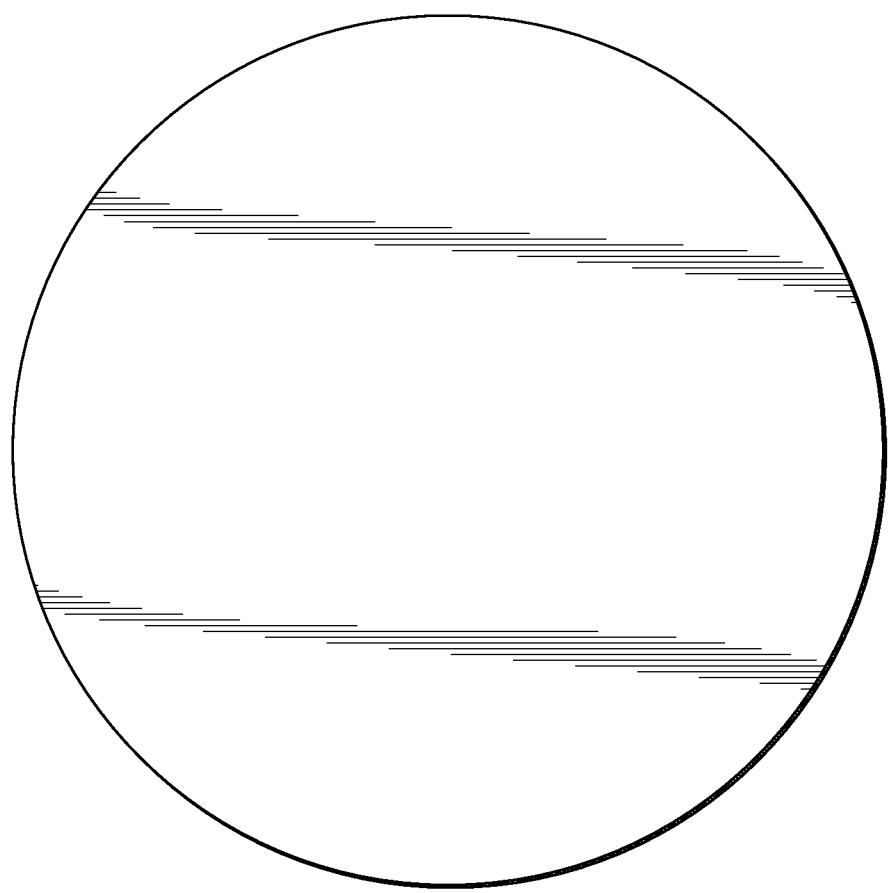
FIG. 15A shows a plan view of embodiment of a $CO_2$ TSA large vessel having sizing for a 20 MW semi-closed cycle gas turbine (e.g., having dimensions of 28'D×6.5')
Figure 15B:
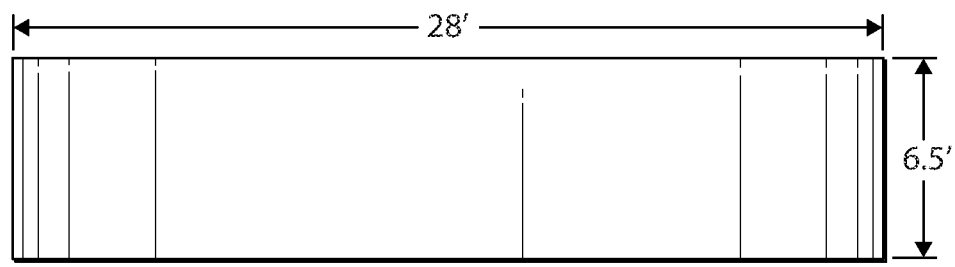
FIG. 15B shows a side view of the embodiment of FIG. 15A.

Embodiments can be very large and present challenges in manufacturing and transport. The following embodiments can address these challenges. FIG. 15A shows a plan view of embodiment of a $CO_2$ TSA large vessel having sizing for a 20 MW semi-closed cycle gas turbine (e.g., having dimensions of 28'D×6.5'). FIG. 15A shows an example 20 MW SCC Gas Turbine adsorber, which is very large and requires large components (e.g., duct work about 60" D equivalent). FIG. 15B shows a side view of the embodiment of FIG. 15A. Embodiments can use four vessels, one in adsorption, one in regeneration, and two in cooling. Any suitable dimensions are contemplated herein.

Figure 16:
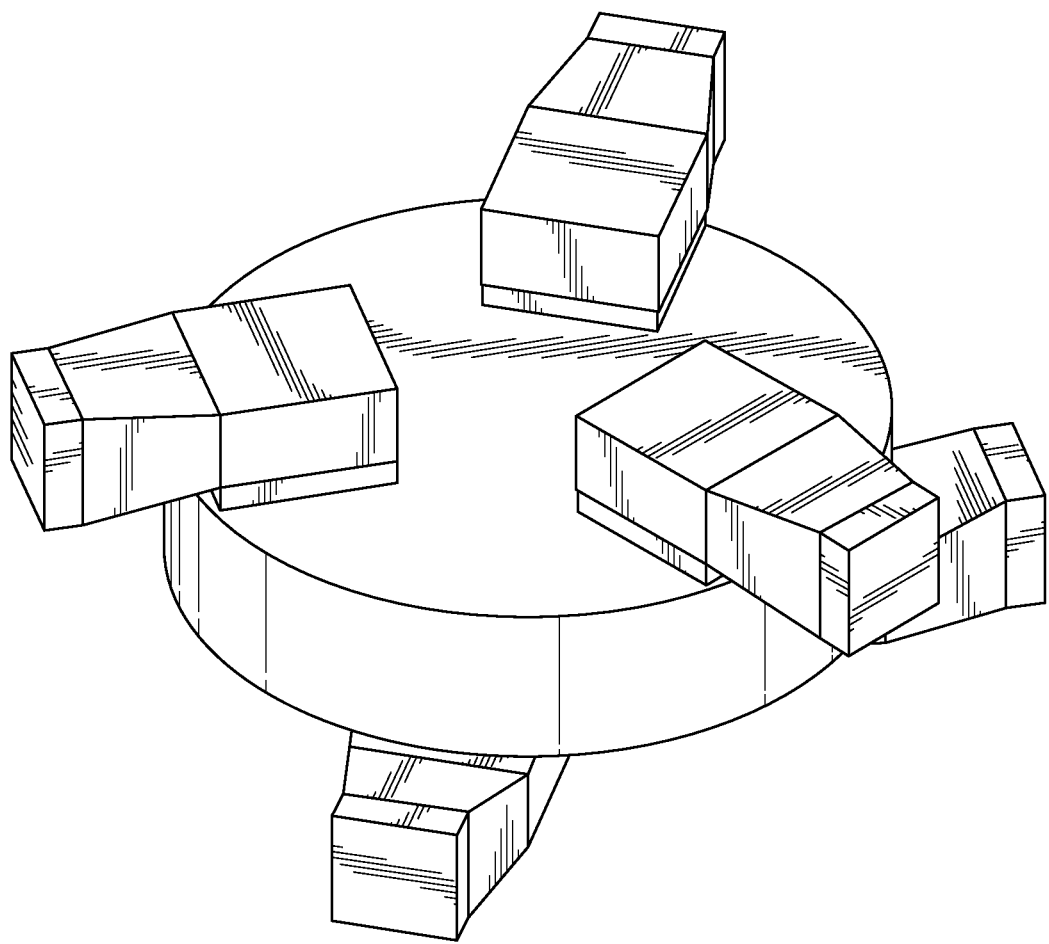
FIG. 16 shows a perspective view of an embodiment of a $CO_2$ TSA large vessel shown attached to an embodiment of ducting and/or valving for a stacked arrangement.

FIG. 16 shows a perspective view of an embodiment of a $CO_2$ TSA large vessel shown attached to an embodiment of ducting and/or valving for a stacked arrangement. FIG. 16 shows a single TSA having three about 84"×84" dampers at the top and the bottom, as well as transitions to about 60" square duct.

Figure 17:
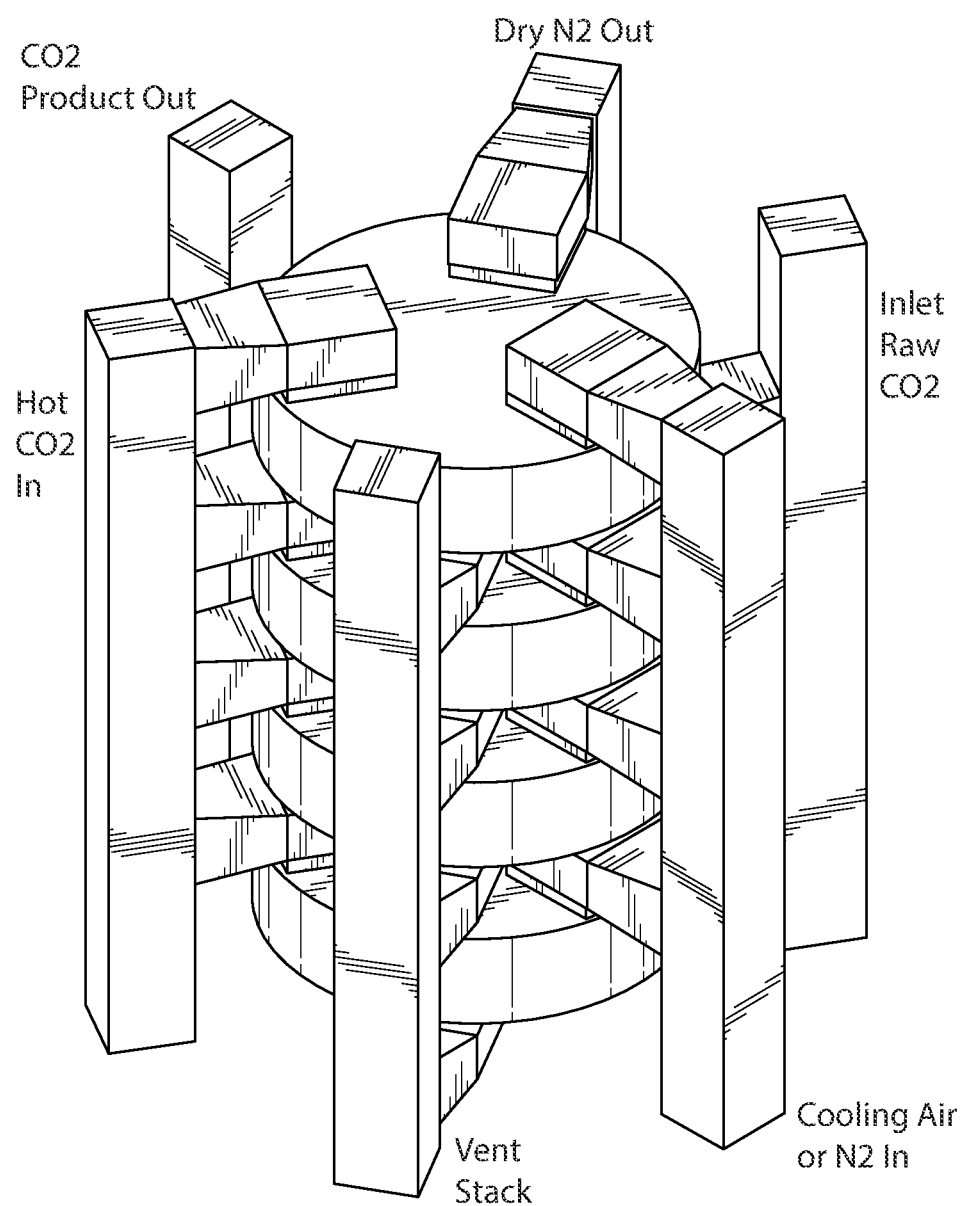
FIG. 17 shows a perspective view of an embodiment of a stacked arrangement of four of the embodiment of FIG. 16.

FIG. 17 shows a perspective view of an embodiment of a stacked arrangement of four of the TSA embodiment of FIG. 16. FIG. 17 illustrates a structure vertically built for efficient ductwork sandwiching. As shown, six manifolds and twenty four (24) valves serve beds. In certain embodiments, the overall system can have about 50'D×50'H and can include about 300 or more tons of media aloft.

Figure 18A:
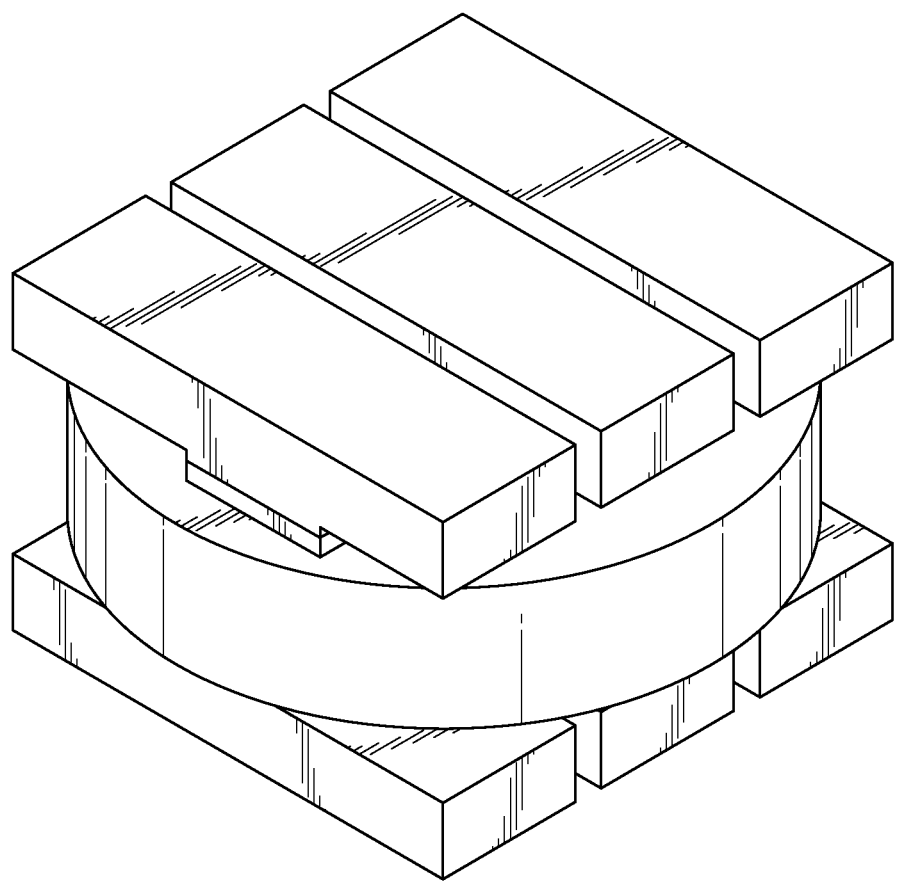
FIG. 18A shows a perspective view of an embodiment of a $CO_2$ TSA large vessel shown attached to an embodiment of ducting and/or valving for a horizontal arrangement.
Figure 18B:
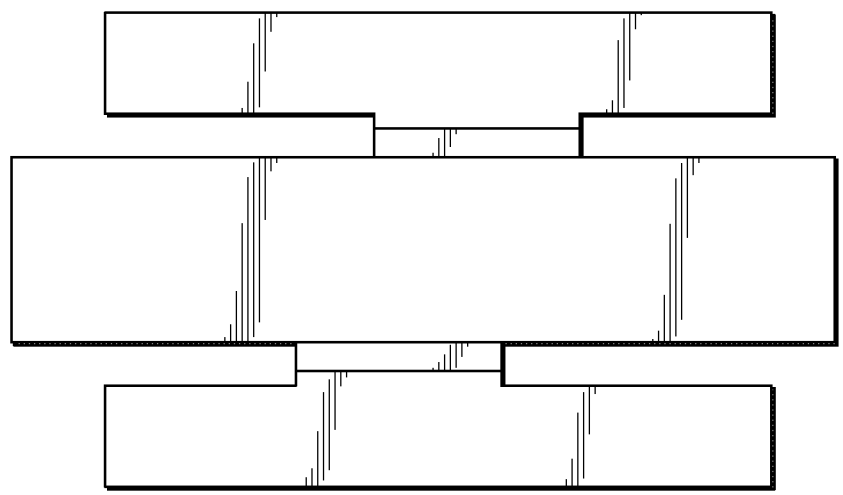
FIG. 18B shows a side view of the embodiment of FIG. 18A.

FIG. 18A shows a perspective view of an embodiment of a $CO_2$ TSA large vessel shown attached to an embodiment of ducting and/or valving for a horizontal arrangement. FIG. 18B shows a side view of the embodiment of FIG. 18A. FIGS. 18A and 18B illustrate an alternative horizontal arrangement to the top and bottom ducts. In certain embodiments, four vessels could fit in 120'×30' space in such an embodiment, for example.

Figure 19:
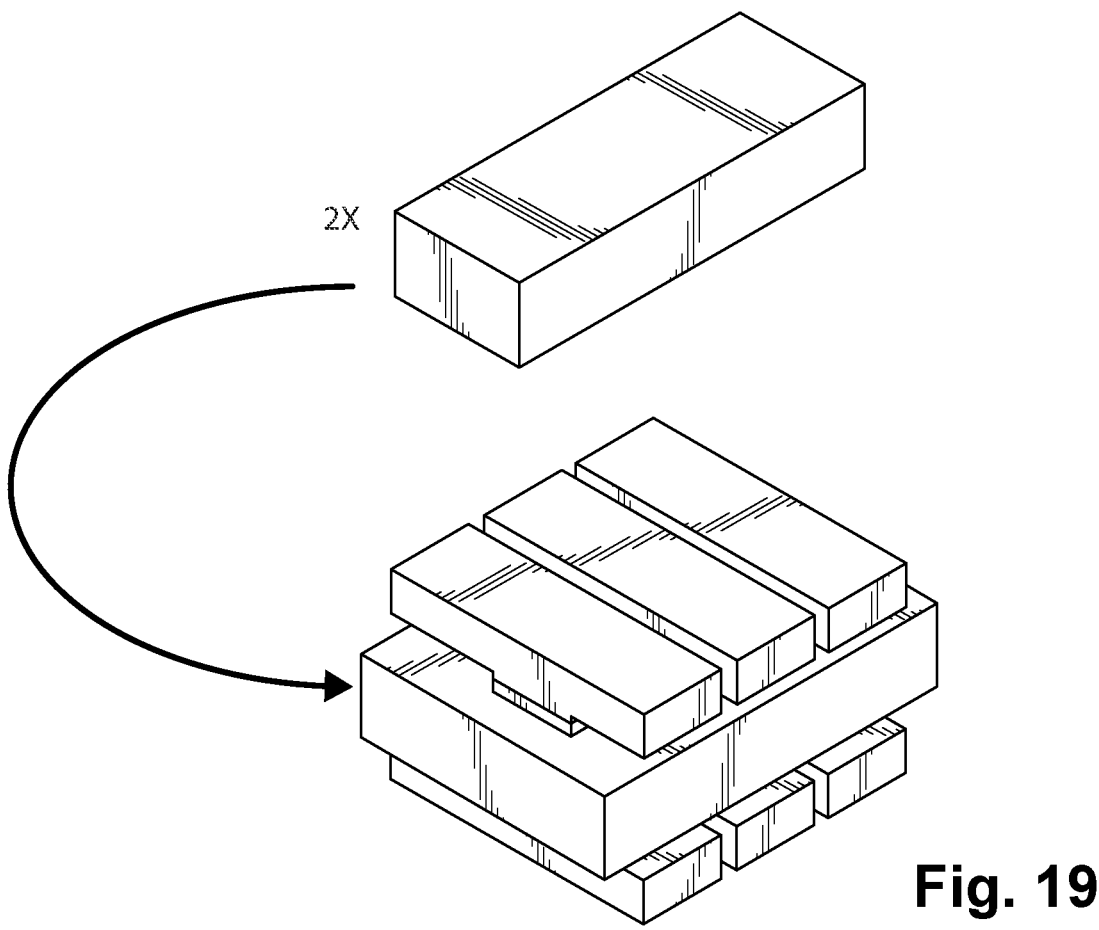
FIG. 19 shows a perspective view of an embodiment of a $CO_2$ TSA vessel and modular construction method for a horizontal arrangement.
Figure 19A:
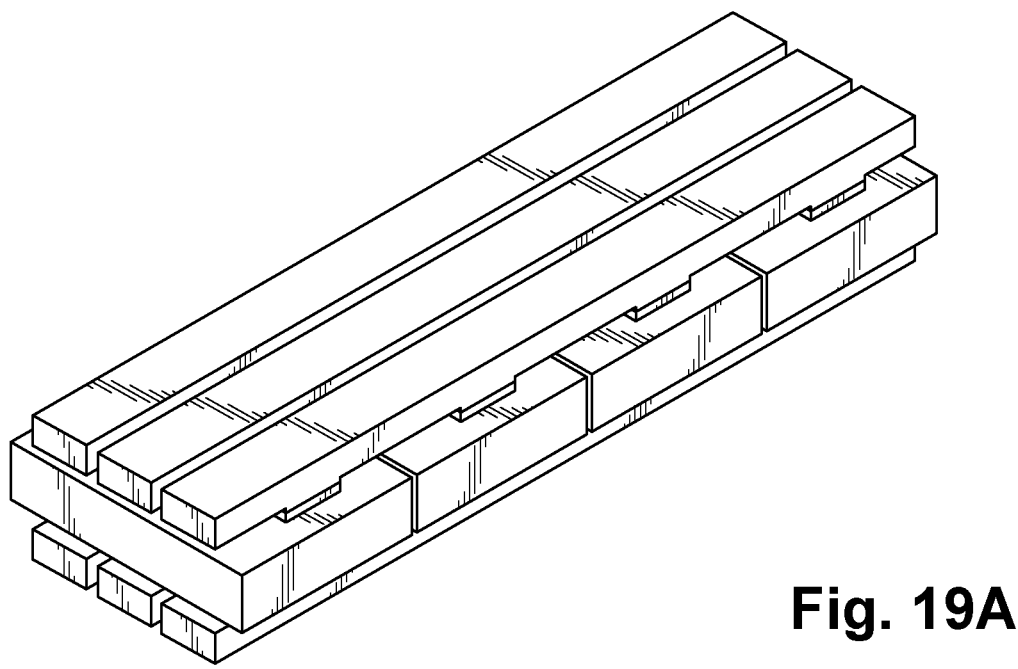
FIG. 19A shows a perspective view of an embodiment of a modular arrangement of a plurality of the embodiment of FIG. 19.

FIG. 19 shows a perspective view of an embodiment of a $CO_2$ TSA vessel and modular construction method for a horizontal arrangement. FIG. 19A shows a perspective view of an embodiment of a modular arrangement of a plurality of the embodiment of FIG. 19. The embodiment of FIG. 19 can include a 28' diameter equivalent in 22'×30'. Such embodiments can ships in two 11'×30' modules. Seals between modules are external to insulation (e.g., low temperature). Such embodiments have ducts and valves on both sides of the media.

Figure 20:
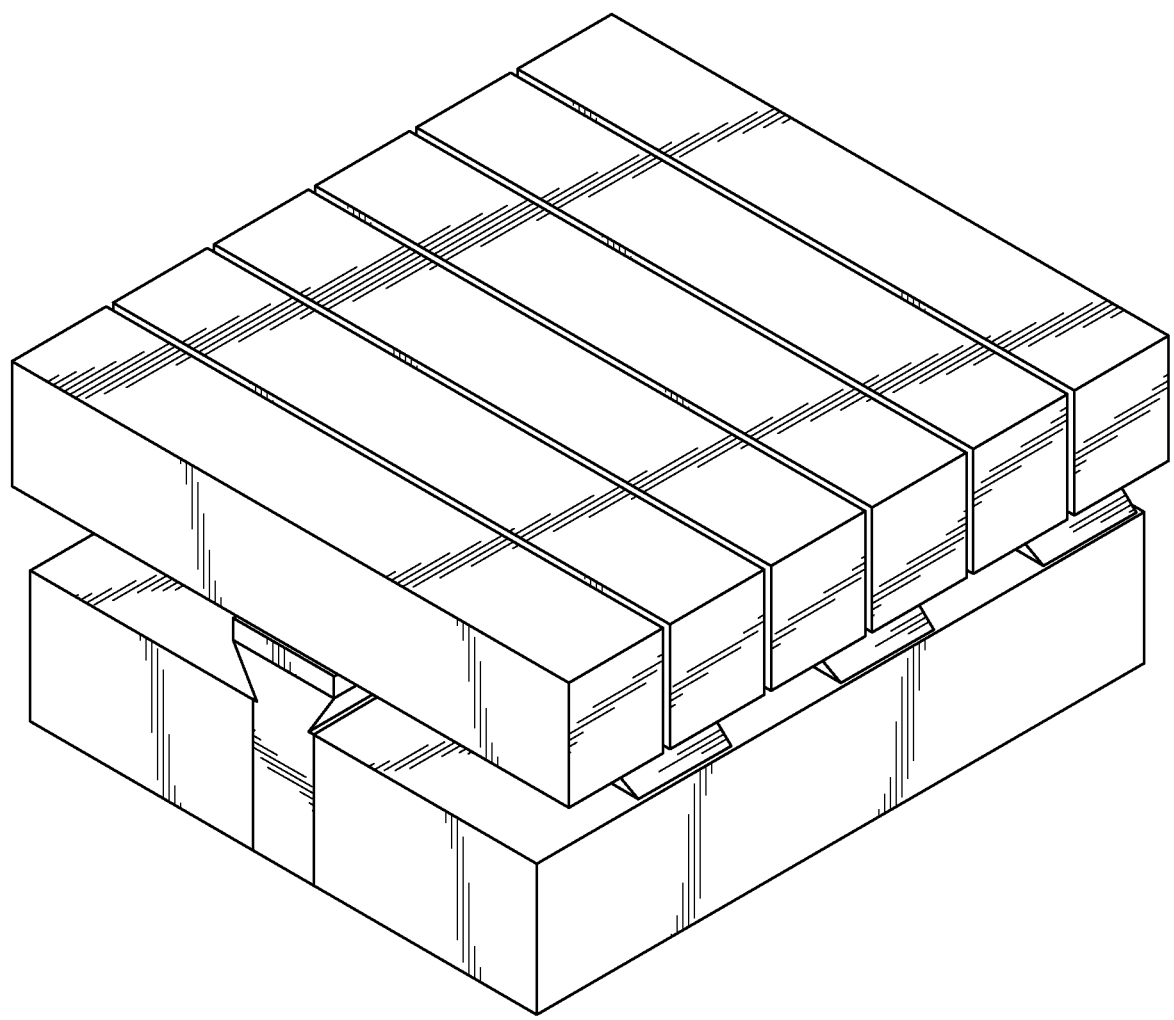
FIG. 20 shows a perspective view of an embodiment of a $CO_2$ TSA modular construction with one or more vertical ducts between modules.
Figure 20A:
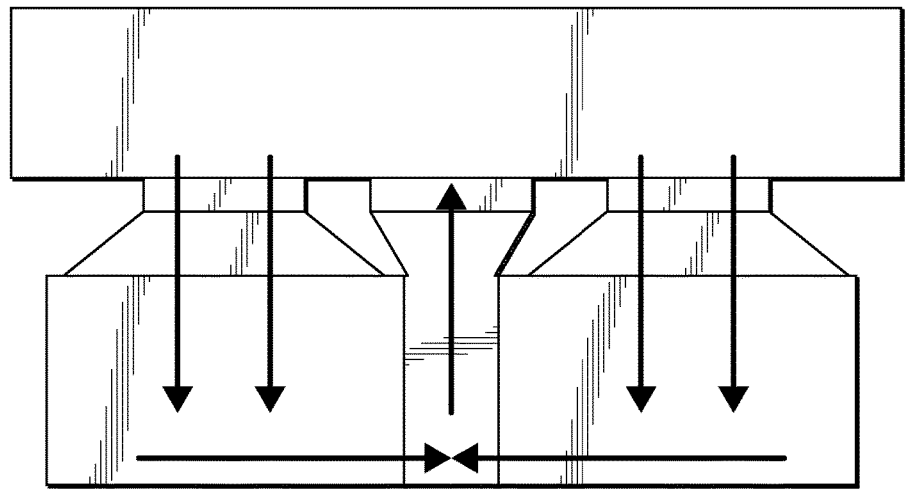
FIG. 20A schematically illustrates flow directions for different modes of the embodiment of FIG. 20.
Figure 20A:
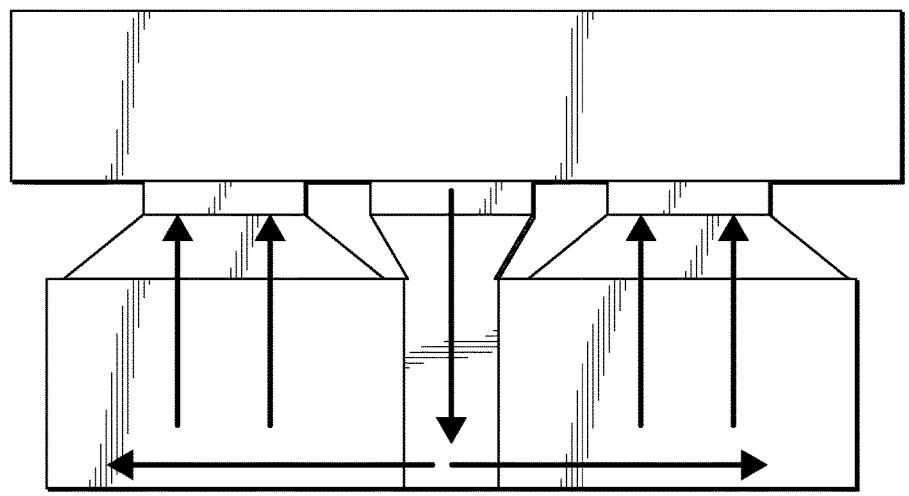
Figure 20B:
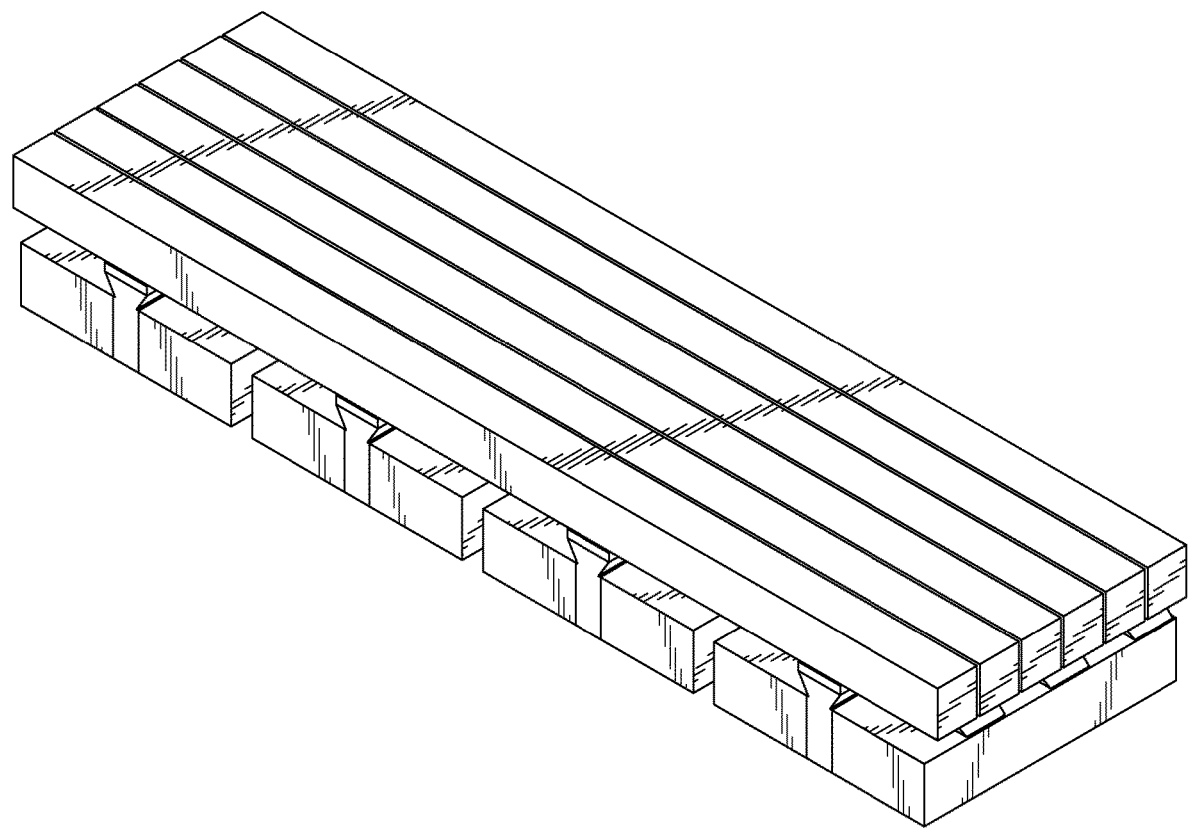
FIG. 20B shows a perspective view of an embodiment of a plurality of the embodiment of FIG. 20 shown connected together.

FIG. 20 shows a perspective view of an embodiment of a $CO_2$ TSA modular construction with one or more vertical ducts between modules. FIG. 20A schematically illustrates flow directions for different modes of the embodiment of FIG. 20. FIG. 20B shows a perspective view of an embodiment of a plurality of the embodiment of FIG. 20 shown connected together.

In certain embodiments, e.g., as shown in the embodiment of FIG. 20, the ducting can be disposed on a single (e.g., top) side. As shown six flow paths are on a top side for a single TSA. Such embodiments provide even further improved packaging with all ducting on one side. Embodiments can include a similar sandwich structure of the cylindrical embodiments above, for example.

A larger surface can enable all ducts on one side, with a vertical transfer duct to the bottom as shown. In certain embodiments, the vertical duct can be between $CO_2$ TSA module pairs. As shown in FIG. 20A, top down bed flow for cooling and regeneration can provided higher flowrates, and a bottom up bed flow for adsorption can provide lower flowrates.

FIG. 20B shows four module pairs attached together. Given the form factor, such embodiments can be built on a foundation and can also be transported in traditional shipping containers. Four vessels shown can alternatively be housed in a single concrete foundation. No access to the underside of vessels required in such embodiments.

Additional Non-Limiting Description of Certain Embodiments

FIG. 2 provides one embodiment of certain embodiments of this disclosure, the $CO_2$ TSA for the SCC, and will be discussed in detail herein. As is the case with any engine, fuel must be combusted, and that requires an oxidizer, which is generally air. Referring to the engine on FIG. 2, the engine (turbine or piston) is Fig. in working fluid from the intake buffer tank, which is a mixture of air, oxygen, and cooled exhaust. The mixed concentration of oxygen in the intake buffer tank is a variable, but generally falls in the range of 12-22% $O_2$. The engine combusts fuel in this artificial atmosphere to produce a hot exhaust, which then flows through catalysts (if present) and supplemental combustion (if present) directly into the exhaust heat exchanger, $CO_2HX$. This heat exchanger partially cools the exhaust, typically to about 400 F, where it is then mixed with colder water, quenching the exhaust, typically down to about 100 F. This condenses most of the water from the combustion products, and that water is removed in a conventional gas liquid separator. Water accumulates in a storage tank unless it is otherwise used or disposed of-frequently this condensed water is used as make up water in a cooling tower, eliminating or reducing the problem of water disposal. The cooled exhaust, now depleted of most of the water, returns to the intake buffer tank or to the TSA screw/blower. The flowrate at this TSA screw/blower, which is generally variable speed drive or includes other methods of flow regulation, indirectly sets the level of exhaust recirculation—since the engine flowrate is essentially fixed, whatever is not removed by the capture system will be recirculated, and the balance of the engine needs will be made up by air and/or oxygen. Downstream of the screw/blower is the balance of the $CO_2$ TSA capture system. Immediately downstream of the screw is a heat exchanger/chiller, typically cooling to 35-50 deg F., which will cause more water to condense, reducing the load on the molecular sieves that follow.

The first step of the process is the water dehydration, typically by blend of alumina and 3A sieve, in adsorbent vessels TSA1 and TSA2. This is a batch type process, when one vessel is adsorbing water, the other one is off-line, either being heated or cooled; valves TIM and T2In control which vessel is receiving the cooled exhaust. For discussion purposes, assuming TSA1 is dehydrating then valve TIM is open, and the exhaust flows through TSA1 and out valve T1D, through another cooler P2T, to one of three capture vessels TS3, TS4, or TS5. At the inlet of the capture TSA vessels, the exhaust has essentially zero water, typically 5-20% $CO_2$, 0-10% $O_2$, and balance inert (Nitrogen, with a little Argon).

Assuming TS3 is at this point adsorbing $CO_2$, valve T3In will be open, with T4In and T5In closed. The exhaust gas, now depleted of $CO_2$ and water, flows out of TS3 via T3T, which is open, while T4T and T5T are closed. This relatively cool dry gas, mostly $N_2$, is manifolded to several locations. First, if all downstream valves are closed, or if backpressure for some reason is high temporarily, any excess gas will be discharged to the air via the $CO_2$ TSA vent, controlled by the back pressure regulator, BPR. Generally, the pressure is lower than the setpoint and BPR remains closed. A portion of this dry $N_2$ gas is used to heat either TSA1 or TSA2 (whichever is not adsorbing water, in this example TSA2), or to cool TSA2, depending on the cycle time. For example, if the design point was 8 hours for water adsorption in TSA1 and TSA2, then TSA1 would be adsorbing for 8 hours, and in parallel with that TSA2 would be first regenerated (heated) by opening T2H and T2X, using the heated dry $N_2$, for about 4 hours, and then would be cooled by opening T2C, while closing T2H (T2X still open). After 8 hours this process would reverse, with TSA2 taking over the dehydration adsorption duty, and with TSA1 being heated, then cooled, via combinations of valve actions at T1H, T1C, and T1X. The cycle time for water adsorption is typically several hours, generally between 3 and 12 hours.

There is in most cases an order of magnitude more $CO_2$ in the exhaust than water in the exhaust, and the capacity for $CO_2$ per unit weight of mole sieve is lower than that of water, and as a result, the cycle times for the $CO_2$ adsorption function in beds TS3, TS4, and TS5 are measured in minutes, not hours. As discussed herein, assuming TS3 is adsorbing $CO_2$, T3In and T3T are open, and a portion of the dry $N_2$, optionally further cooled via a chiller, can pass through T4C or T5C to provide cooling to those beds, and will exit via T4X or T5X. It is noted that the volume of gas required for cooling may not be met fully by the flow rate coming from TS3, and discussions of how to augment the flow via recirculation or mitigate the amount of flow needed will follow later in this disclosure.

After the $CO_2$ adsorption cycle is complete, the captured $CO_2$ must be released, and in a TSA process that is mostly via heating. In certain embodiments of this disclosure, that heating is provided by a hot gas mixture, which is mostly $CO_2$, in this example delivered via valve T3H to bed TS3. The hot $CO_2$ supply is generally at 600-800 deg F., 650 deg F. being the most common design point. The gas flows downward though the media in vessel TS3, gradually heating the media, and driving off more $CO_2$, this warm $CO_2$ flows via valve T3D to a cooler, and a portion of the gas splits off, flowing through a separator (in theory unneeded, this being dry gas, it is really there to add volume to improve control), to a screw compressor, and downstream to the rest of the $CO_2$ compression or use systems. The flowrate at this $CO_2$ screw, also generally variable speed, sets indirectly the pressure in vessel TS3 during the desorption process.

The desorption flowrate required is much higher than the raw exhaust flowrate on both a mass and volume basis. In addition, given the higher temperature, the pressure drop through the bed would also be higher, up to 10 psi, vs. 1-2 psi for adsorption, resulting in high electrical loads. In the invention the $CO_2$ product is recirculated to support these higher flowrates, and more importantly, the powering for the recirculation is via a "$CO_2$ Turbo", with the heat required to power that turbocharger, and to heat the bed itself, coming from the exhaust of the engine. Referring again to FIG. 2, after passing through T3D and the cooler, a portion of the $CO_2$ product enters the turbo charger compressor, typically boosted to 15-25 psi, raising the temperature to 300 deg F. or more, where it then enters the $CO_2$ HX, and is heated to near raw exhaust temperature, typically 800-900 deg F. This hot $CO_2$ is then expanded through the expander side of the turbo charger, resulting in the 600+ deg F. $CO_2$ required for regeneration, still at a pressure high enough to support flow through the bed, since as is normally the case with a turbo charger the pressure increase on the compressor side significantly exceeds the pressure decrease on the expander side.

At the end of the regeneration process, virtually no $CO_2$, and of course almost no water, remain in the TS3 bed. The media is hot, typically with an average temperature of about 500 deg F. The media must be cooled to ready it for the beginning of the next adsorption cycle, and this is accomplished by opening valves T3C and T3X, while closing T3In, T3T, T3H, and T3D. The cooling process need not return the media temperature fully to ambient, referring again to FIG. 1, anything under 100 C (212 F) will provide some capacity for initial adsorption of $CO_2$, with near or below 50 deg C. (122 F) preferred. The bed cooling will continue in parallel with the adsorption process to some degree since the raw exhaust stream is provided at nominally 10 deg C. (50 deg F.).

The direction of flowrates, and sequence of operations, for the TSA process are depicted generically on FIG. 2A. An example of the timing of the process, for the TSA dehydration, using a two bed TSA, and the TSA Capture, using the three bed TSA, are summarized in FIG. 2B. For similar sized beds, the dehydration process will be much slower, several hours per bed, than the capture process, which could in theory be done very rapidly, but in practice is done with 10-30 minute process intervals.

Variants of certain embodiments of this disclosure and preferred process embodiments will now be reviewed. The embodiments of FIGS. 3-9 can address these basic process variants, though different combinations of those variants would often be used depending on the engine specifics and other process requirements.

As was discussed with FIG. 1A, the state-of-the-art today uses a TSA process for dehydration, but multiple stages of Vacuum Pressure Swing Adsorption (VPSA) or PSA processes for capture (VPSA is technically a subset of PSA, but is a term often used in the industry). In certain embodiments of this disclosure, as was discussed in the description of FIGS. 2, 2A, and 2B, the same basic process (TSA) is now used for both the dehydration and capture, with nominally the same capture and regeneration temperatures, though for similar size vessels the cycle timing of these processes differ.

Referring to FIG. 3, given that in certain embodiments of this disclosure the TSA process is used for both dehydration and capture, it is possible to combine these functions in a single vessel. That vessel could either have layers of different media, to control where the functions occur, could have blends of media, or have a single media, since as is depicted in FIG. 1 certain media have both $CO_2$ and $H_2O$ capture capability.

Specifically, FIG. 3 repeats the basic process of FIG. 2, with the elimination of vessels TSA1 and TSA2, and their associated valves T1In, T2In, T1X, T2X, T1C, T2C, T1H, T2H, T1D, and T2D, as well as eliminating the between process cooler P2T.

FIG. 3 retains all the process associated with the eighteen T3-T5 family valves. The amount of dehydration media is now much less than the capture media since the shorter capture cycle time will still rule, and alternatively since the capture media has some dehydration capacity the dehydration layers could be eliminated, but this is not practical in most cases since typical capture media costs more than alumina or 3A. The capture process timing of FIG. 2A is retained, though the additional duty will either require slightly larger vessels, or slightly shorter process times.

In certain embodiments, the gas flowrate for capture and regeneration are not equal, and that is accommodated by recirculation of the $CO_2$ for regeneration. Although substantial reduction in capital equipment and valve count is achieved with the change from the FIG. 2 to FIG. 3 inventions, the cooling requirements of FIG. 3 are in some cases worse than that of FIG. 2, since the dehydration media must also be cooled on the faster cycle. This can be addressed by changing the number of vessels, it is possible to design a system with as few as two vessels, so long as the heating and cooling times can be accomplished on one vessel in parallel with adsorption times on the other. This is analogous to the two vessel dehydration timing of FIG. 2B. It is also possible to go in the other direction, with four or five or even six vessels, so that the available time for cooling and/or heating is longer than the time for capture. These basic options are summarized in Table 1 below.

TABLE 1

| $CO_2$ TSA Number of Beds (compartments) | Process Time for Adsorption | Available Time for Heating (Regeneration) | Available Time for Cooling |
| --- | --- | --- | --- |
| 2 | X | 0.5X | 0.5X |
| 3 | X | X | X |
| 4 | X | 1.5X | 1.5X |
| 5 | X | 2X | 2X |
| 6 | X | 2.5X | 2.5X |

It is also possible to have unequal times for cooling and heating, for example a four bed design could have a cycle time of X for adsorption, X for regeneration, and 2X for cooling, or the reverse, or anything in between, as long as the cycle was ultimately able to synchronize and repeat.

FIG. 3 results in a substantial savings and simplification over the state of the art mole sieve capture system for the Semi-Closed Cycle (SCC). The capture and dehydration portions of FIG. 3 would also work without the exhaust gas recirculation of the SCC, but some method of concentrating $CO_2$ upstream of the mole sieve capture process reduces the number of stages required to achieve a commercial quality or sequestration quality of $CO_2$, ultimately enabling a single stage capture system for sequestration applications, with proper well design.

Referring to FIG. 4, all of the components of FIG. 3 are repeated, with their associated processes and timings, with some additional components to address mostly the issues of cooling, and required $CO_2$ specifications for non-sequestration or pipeline applications. The use of an $N_2$ recirculation fan, with a cooler, is an alternative to additional vessels or can be used in combination with additional vessels, to enable adequate cooling in the available time. A bypass valve around the $CO_2$ HX also exists. This enables reduction in both flowrate and temperature during the regeneration cycle. Once enough heat is "in" the vessel and top layers of the media, and the $CO_2$ has been driven out of that media, it is possible to reduce flowrate and temperature. The thermal wave will still continue down the vessel, with the media acting as a thermal regenerator, so that the lower levels of media are heated while the top level of the media starts to cool.

Also referring to FIG. 4, new components have been added downstream of the $CO_2$ screw, to include two PSA vessels, with the associated valving P1In, P2In, P1D, P2D, P1X, and P2X. The operation of this PSA process is conventional, but using a media such as alumina or 3A, it will perform the final dehydration at a much lower total flowrate and with much smaller vessels than existed as TSA1 and TSA2, and for applications requiring very low dewpoint (like interstate $CO_2$ pipelines) this add on PSA enables certain embodiments of this disclosure to still meet those pipeline specifications. As will be familiar to those with PSA knowledge, with P1In, P1D, and P2X open, with the other valves closed, the vessel downstream of P1In will adsorb water, while the vessel downstream of P2In vents water, and with the reverse valve positions the reverse will occur.

FIG. 5 includes some of the same enhancements as FIG. 4, with some additional components that aid system startup, and provide an additional method to concentrate $CO_2$ prior to the TSA. Referring to FIG. 5, the $CO_2$ Turbo, unlike the turbo charger on a typical engine, will typically require starting. The $CO_2$ turbo could physically be an electrically driven "compander" with a compressor and expander, typically on a common bull gear, and one started the motor power would go to near zero (or even become negative, acting like a generator). If the $CO_2$ turbo were more like an engine turbo charger, with the compressor and turbine physically connected on a common shaft, with no external input or output, then something has to start that shaft spinning. To achieve startup, the higher pressure $CO_2$ (or whatever gas exists at this point in the process initially) is compressed, and admitted to the $CO_2$ Turbo expander, downstream of the compressor but upstream of the $CO_2$HX via check valves or automated valves to mechanically start the spool up of the turbine, once the $CO_2$ turbo expander sees the hot gas, it will quickly start, opening the check downstream of the $CO_2$ Turbo compressor, and closing the other (if not automated). FIG. 5 also includes an additional feature, since the flowrate through the regeneration process is typically much higher than that of the raw engine exhaust (typically double), and since this flow is high purity $CO_2$ (>>90% $CO_2$) while the engine exhaust, even with the SCC is much lower purity $CO_2$ (at times<10% $CO_2$) a very small bleed flow, as a portion of the $CO_2$ regeneration flow, will have a substantial impact on the raw $CO_2$ purity entering the cycle. This recirculation of the $CO_2$ TSA is another method of concentrating exhaust $CO_2$, analogous to the SCC, but without requiring $CO_2$ return to the inlet of the engine, the latter of which sometimes requires a larger oxygen plant or other engine modifications not compatible with certain engine types, especially in retrofit projects or for new installations using standard engine manufacturer offerings, ratings, and controls, not optimized for the SCC.

FIG. 6 represents another enhancement to the basic invention of FIG. 3. For very efficient engines, in particular highly efficient lean burn piston engines, insufficient exhaust heat exists to fully support the $CO_2$ TSA $CO_2$ Turbo operation. In other cases, sufficient heat exists, but the customer has chosen to use that heat in their own process, so less of the total exhaust heat is available. In an extreme example (as depicted in FIG. 6) none of it is available, and the $CO_2$ turbo has been replaced with an electrically driven blower, and the $CO_2$ HX has been replaced with an electric heater. The rest of the process remains the same. In practice, the $CO_2$ HX would exist, and the $CO_2$ Turbo would exist, in the form of a compander (electrically assisted), but with additional heat and power provided by the motor on the compander, and a small heater downstream of the $CO_2$ HX of FIG. 3, but upstream of the $CO_2$ expander or of the T#H valves.

FIG. 7 represents some of the enhancements already discussed in FIGS. 4-6, with some new features. Specifically, the recirculation $N_2$ blower of FIG. 4 has been replaced with an air blower or fan, and chiller, to drop out as much water as possible (dewpoint about 40 deg F., or <<1% water). Air is used in addition to the dry $N_2$ for the cooling process. As previously discussed, $N_2$ flows from the T#T valves to the T#C valves consistent with FIG. 2B, but now this flowrate is augmented, upstream of the T#C valves with the partially dehydrated air. This eliminates the $N_2$ recirculation cooler, which is a large component, and brings additional benefits. The use of direct air cooling in the $CO_2$ TSA will more effectively and rapidly cool the beds since the air is at lower temperature than the recirculating $N_2$. It will also cause the beds to capture a small amount of $CO_2$ from the air. This is typically 1-2% of the total $CO_2$ captured but is enough to make the entire system carbon negative (non-emissive) since the $CO_2$ TSA was already capable of capturing>99% of the $CO_2$ with proper design in the first place.

Another enhancement of FIG. 7, more applicable to gas turbine than piston engines, is the use of a counter flow direct contact cooler within the SCC. This substantially reduces the flowrate of cold water required for quench but does add backpressure. The turbine engines are more tolerant of this backpressure than piston and would otherwise require very high water flowrates to achieve the quench.

A final enhancement of FIG. 7, also more applicable to gas turbine than piston engines, is the use of an adsorption chiller vs. a mechanical chiller to support the larger cooling requirements associated with partial dehydration of air and other cooling loads within this cycle. It should be noted that FIG. 7 retains the final dehydration PSA of FIG. 4 or 5 since the use of direct air cooling will result in more water included in the $CO_2$ product, requiring final dehydration in most applications.

FIG. 8 reflects another variation of certain embodiments of this disclosure, again applicable to piston engines with limited exhaust heat or turbine engines with all or most of the heat already used by others. The Fig. depicts a small combustor between the $CO_2$ Turbo compressor and expander that basically turn this turbocharger into a small hot $CO_2$ generator. Since the amount of firing to achieve the desired temperature is very low, and the resulting mixtures would not be flammable with air oxidation, and since this is already on the product side of the capture process, this mini gas generator is fired with oxygen. The products of combustion are $CO_2$ and water, and since that $CO_2$ is hot it will ultimately flow through the media and be added to the captured $CO_2$. Combustion water will be removed by the final PSA, as per FIG. 7. This approach is only practical in SCC implementations that were already using a high purity oxygen source, since the economics of $O_2$ generation for this small load only are not economically viable in most cases.

FIG. 9 represents a more often used and practical method of enhancing available exhaust waste heat. As is the case with many Heat Recovery Steam Generators, it is common to have supplemental combustion in the gas turbine exhaust to augment available heat. This is compatible with the SCC, but another method of achieving the same result is to install a burner upstream of the $CO_2$ HX, but in parallel rather than in series with the main exhaust flow. This is much more compatible with retrofit installations and will generate a concentrated $CO_2$ stream about 11% which can be added to the raw SCC exhaust downstream of the customer heat exchanger, but upstream of the quench system.

Discussion of FIGS. 10-20 follows to address mechanical implementation of certain embodiments.

The $CO_2$ TSA invention, and to a lesser degree, the SCC itself, have varied implementation as a function of engine efficiency and customer installation specifics (mostly as a result of differing amounts of available exhaust waste heat). The $CO_2$ TSA invention also has a different mechanical implementation for small systems, typically for piston engines, where the individual vessels can be subsets of a larger, but still transportable/modular system. Conversely, for much larger systems, and generally for larger gas turbines, it is necessary for mechanical reasons to split the flows into multiple streams, i.e. "dual exhaust $CO_2$ TSA" or alternatively to split the vessel compartments into multiple modules to be assembled on site. This is possible since the three functions of the $CO_2$ TSA process; adsorption, regeneration, and cooling; all occur at essentially the same pressure, with the regeneration being at slightly higher pressure. Because there are similar pressures, and all pressures are low, the structural requirements are minimal. More importantly, since the regeneration ($CO_2$ production) is at slightly higher pressure, any leakage will be from the product (regeneration) side back into the process sides (adsorption or cooling), no $CO_2$ will be lost, and no product impurity will result as a function of leakage. What appears to be piping/ducts in the process Figs. can in fact by baffles or panels, within larger structures, and without worry regarding tight sealing between processes of the $CO_2$ TSA invention.

FIG. 10 represents a typical general arrangement for certain embodiments of this disclosure on a small, nominally 1 MW, piston engine generator. As is typically the case, the engine is mounted inside an enclosure, which in this instance includes the SCC recirculation system and exhaust quench. Three radiators are mounted at the front of the enclosure, one for SCC quench water, one for after cooler water, and one for jacket water. The $CO_2$ HX is on top of the enclosure, and the balance of plant reflects an electric driven $CO_2$ blower, with $N_2$ recirculation fan and heat exchangers. The $CO_2$ TSA vessels TS3, TS4, and TS5 are shown as individual round pressure vessels, of lightweight construction (in most cases stainless).

FIG. 11 provides details of the top headers for: Hot $CO_2$ inlet (prior to regeneration), Dry $N_2$ outlet (after adsorption), Dry $N_2$ inlet (for cooling). FIG. 11 also provides details of the bottom headers for: Exhaust Inlet (for adsorption), $CO_2$ Outlet (after regeneration), and $N_2$ Outlet (post cooling). All of the aforementioned is for the layered vessel approach, with the dehydration and capture process occurring in a single vessel.

FIG. 12 provides details of a key to certain embodiments of this disclosure. The media is held within very thin wall stainless liners, which are insulated internal to the vessel walls, and internal to the lid. In this way, only the media, and a very small amount of supporting metal inner liner, has to change temperature for the process. New developments in thin high performance aerogel insulation, particular that of Aspen Aerogels, enables this design.

FIG. 13 and subparts show different views of the cross section of a single vessel, for example TS3. The relative loading of the dehydration (guard) layers (generally using 3A or alumina), above and below the capture media (generally 5A or 13X) is shown. It is important to have good flow distribution through the media, and it is also important to have low pressure drop. Both goals are achieved with a relatively short aspect ratio—the media height is usually much less than the vessel diameter. The duct work is also oversized, for low pressure drop and low velocities, with baffle plates used to aid in the distribution of flow from the ducts to the beds. Computational Fluid Dynamic (CFD) modeling has shown that the typical ceramic balls, often used as flow distributors in mole sieve vessels, can be largely if not fully eliminated via baffle plates. The guard media is also often more coarse (larger size) than the capture media, to further aid distribution.

FIGS. 10-13 have all shown three independent TSA vessels, all cylindrical, with flat lids. There are other vessel configurations, to include semi-elliptical heads, hemispherical heads, or even spherical vessels that could be used, and are often used in pressure vessel design, and could be used in the invention. The nature of the design, with very low pressures, and with similar pressures in the three different processes, enables unusual designs for a "pressure vessel". Flat sided modules or compartments, to include hexagonal or rectangular/square cross sections, could be packed within a single larger "pressure" structure. The largest loads in this invention vessel design are often not driven by the gas pressure, but by the weight of the media, combined with the pressure drop of the media.

FIG. 14 depicts one alternate packaging method for TS3, TS4, and TS5—though this method could be used with a fewer or greater number of TSA compartments. FIG. 14 shows a single rectangular cross section vessel, with three compartments, which in terms of media loading and cross section equivalent to the three vessel design of FIG. 11. FIG. 14A shows an interior view with the lid removed, and the three independent compartments can be seen, with the same basic internal liner and internally insulated construction as depicted for the round cross section vessels of FIGS. 12 and 13. Tie rods or internal structures inside the media would aid in supporting the thin wall against the weight of the media. FIG. 14B is the same as 14 and 14A in terms of vessel design, but the top and bottom pipes for $N_2$, $CO_2$, and Exhaust are replaced with ducts, and internal dampers, all of which are inside the larger pressure boundary/structure, though some pressure difference still exists between the three processes during operation. As has been previously discussed, some leakage from the regeneration process into the other processes will not significantly harm the operation, and these ducts, as shown in FIG. 14B could actually be created by placing panels within the larger structure. These panels could even include access ports or handholes to enable access to internal mechanisms, such as dampers, damper actuators, and linkages.

FIGS. 15A-20B address different mechanical implementation approaches of certain embodiments of this disclosure associated with larger systems. The sizes shown in FIGS. 15-20 are consistent with a 15-25 MW gas turbine installation. Larger systems have different mechanical challenges and implementation solutions than the smaller systems discussed in FIGS. 10-14. Specifically, the following technical issues dominate in larger systems: electrical loads for blowers (large cross sections minimize pressure drop and hence power), water vs. $CO_2$ adsorption/media impact (adsorption chiller to help remove water prior to TSA), large diameter/cross section duct size, length/volume/pressure drop in ducting, flow distribution in large cross sectional area vessels (requires even lower velocities in ducting), overall footprint, and size of components for transportation.

FIGS. 15A and 15B depicts an exterior view of a single TSA vessel associated with a nominally 20 MW gas turbine implementation of certain embodiments of this disclosure. The example 20 MW SCC Gas Turbine TSA is 28' D×6.5' tall, including baffles and all media. The duct work needs to be about 60" D equivalent, or larger. Four vessels required, with the batch process using 1 for Adsorption, 1 for Regeneration, and 2 for Cooling. It would be possible to design a smaller diameter but taller vessel with the same media loading, but the smaller footprint would result in higher bed pressure drop, and hence higher $N_2$/air and TSA screw powering requirements.

Referring to FIG. 16, in order to keep velocities as low as possible, to aid in even distribution across the large diameter of the vessel, an example mechanical design is shown with three 84"×84" dampers on top, three 84"×84" dampers on bottom, with transitions from the 84" square dampers to 60" square ducts. Different dimensions specific to different TSA requirements could exist, and FIGS. 15A-20B are all meant to provide examples of the embodiments of a design.

The footprint for four 28' D vessels, and all the ducting, would for some installations be a challenge. The length of the ducting, and associated pressure drop between vessels and blowers, could also be significant. FIG. 17 depicts one solution: a stack of 4 $CO_2$ TSA vessels, with 6 manifolds and 24 valves serve the beds. The overall system is about 50'D×50'H, a vast reduction in footprint, however although the vessels are fairly lightweight for their size, over 300 tons of media is aloft, which requires careful structural design, especially in seismic regions.

FIG. 18 shows the arrangement of a single 28'D TSA vessel if the chosen arrangement of the four vessels is horizontal rather than vertical. In this instance, the 84" square dampers are still used, but rectangular ducts top and bottom create sections that are easier to pre-fabricate and ship to the site. In this alternative arrangement with top and bottom ducts 4 vessels would fit in a 120'×30' space, though the vessel components still large, likely requiring fabrication on site.

FIG. 19 addresses the issues of the large vessel diameter, and ability to ship same directly to the installation site. Instead of a 28' D TSA, a rectangular 28' D equivalent TSA of 22'×30' is used. This rectangular vessel can be shipped in two 11'×30' modules, with seals between modules external to insulation (low temperature), with no special gasketing or sealing requirements. Metal to metal bolt up with caulk would be more than sufficient. FIG. 19A depicts how four of these 28' D equivalent vessels, each with two modular compartments, would fit together on site. The footprint is still about 30'×about 100', which is better, and the weight is essentially unchanged, but the cost is lower, as is the installation of internal insulation.

The use of two modules to form each TSA vessel also creates an opportunity. FIG. 20 depicts the use of a central vertical duct, although a vertical duct could also be used on one or both sides, enabling all of the valving and duct work to be on side. As shown on FIG. 20 the ducts are all of the top, but it could just as easily be done with all ducts on the bottom. The preferred embodiment is with the vertical duct between $CO_2$ TSA module pairs.

FIG. 20A is a cross section of one of the TSA vessels, created with two modules and a vertical duct, and shows how the flows would occur for the three processes: adsorption, regeneration, and cooling.

FIG. 20B depicts the assembly of four TSA vessels, using the modular construction and vertical ducts. The four vessels shown could alternatively be housed in a single concrete foundation, since no access to underside of vessels is required, and since the weight is significant. This type of construction would also help eliminate the need for any internal to the media compartment reinforcements and would make loading of the media on site much easier.

Variants of certain embodiments of this disclosure, to include different numbers of vessels, different numbers of compartments, different size ducts, different sized valves and dampers, would be implemented based on specific project requirements and installation constraints.

Embodiments can include a $CO_2$ TSA system, e.g., for the SCC or any other suitable use, TSAs for both dehydration and capture, dual or multi-layer TSAa, dehydration and capture in the same vessel (e.g., in the same media or with layered media), ulti-layer TSAs with $N_2$ recirculation fan, a final de-hydration via PSA process, a $CO_2$ turbo start via gas injection, a $CO_2$ bleed to exhaust to further concentrate $CO_2$, an electrically driven $CO_2$ blower, a partially electrically driven $CO_2$ blower (compander), a separate heat source for $CO_2$, direct air (capture) cooling, use of a chiller to reduce water adsorption load, a counter flow SCC quench system, a fired $CO_2$ turbo, a burner augmented $CO_2$ turbo heat exchanger, a burner exhaust $CO_2$ mixed with SCC exhaust, layered TSA vessels, top headers (for hot $CO_2$ inlet (prior to regeneration), dry $N_2$ outlet (after adsorption), a dry $N_2$ inlet (for cooling)), bottom headers (for exhaust inlet (for adsorption), for $CO_2$ Outlet (after regeneration), for $N_2$ Outlet (post cooling)), internally insulated "pressure vessel", a thin wall SS liner, guard de-hy media top and/or bottom, variable area perforated baffles in lieu of ceramic balls in TSA for flow distribution, stacked baffle plates in TSA, multiple compartments in single vessel, no significant pressure or pressure differences, flat sided design possibility with minimal reinforcement, minor leakage between compartments does not being significantly impactful to the process, production at slightly higher pressure than the rest of the process such that impurities cannot leak into the $CO_2$ product, no special high temperature or complex seals required, duct work/baffles for $N_2$, $CO_2$, etc. integrated within modular vessel structure, vertically stacked SCC $CO_2$ TSA vessels, top and bottom ducts for large vessels, large vessels formed with smaller modular vessels, internal vertical ducts for large modular vessels, vertical ducts between modular vessel components, dampers internal to ducts, ducts formed via baffles inside of single structure, vertical internal ducts enabling all valves on top, and/or a top duct arrangement with vertical internal ducts enabling "in ground swimming pool" TSA construction.

Any suitable control module can include any suitable hardware and/or software module(s) configured to perform the associated functions. While certain embodiments have been disclosed above regarding control of valves, for example, and other suitable control scheme and order/timing of controlling valves is contemplated herein. While embodiments having certain construction are shown, any suitable other constructions and having any suitable dimensions and any suitable shapes for embodiments are also contemplated herein.

As will be appreciated by those skilled in the art, aspects of the present disclosure may be embodied as a system, method or computer program product. Accordingly, aspects of this disclosure may take the form of an entirely hardware embodiment, an entirely software embodiment (including firmware, resident software, micro-code, etc.), or an embodiment combining software and hardware aspects, all possibilities of which can be referred to herein as a "circuit," "module," or "system." A "circuit," "module," or "system" can include one or more portions of one or more separate physical hardware and/or software components that can together perform the disclosed function of the "circuit," "module," or "system", or a "circuit," "module," or "system" can be a single self-contained unit (e.g., of hardware and/or software). Furthermore, aspects of this disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of this disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of this disclosure may be described above with reference to flowchart illustrations and/or block diagrams of methods, apparatus (systems) and computer program products according to embodiments of this disclosure. It will be understood that each block of any flowchart illustrations and/or block diagrams, and combinations of blocks in any flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in any flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified herein.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

The articles "a", "an", and "the" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/of" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of"

Any suitable combination(s) of any disclosed embodiments and/or any suitable portion(s) thereof are contemplated herein as appreciated by those having ordinary skill in the art in view of this disclosure.

The embodiments of the present disclosure, as described above and shown in the drawings, provide for improvement in the art to which they pertain. While the subject disclosure includes reference to certain embodiments, those skilled in the art will readily appreciate that changes and/or modifications may be made thereto without departing from the spirit and scope of the subject disclosure.

What is claimed is:

1. A carbon capture system, comprising:
a plurality of thermal swing adsorption (TSA) beds for $CO_2$ capture, including at least:
a first TSA bed configured to capture $CO_2$ within a capture temperature range and to regenerate captured $CO_2$ at a regeneration temperature range above the capture temperature range;
a second TSA bed configured to capture $CO_2$ within the capture temperature range and to regenerate captured $CO_2$ at the regeneration temperature range; and
a third TSA bed configured to capture $CO_2$ within the capture temperature range and to regenerate captured $CO_2$ at the regeneration temperature range;
a plurality of valves and associated flow paths configured to allow switching operational modes of each of the first TSA bed, the second TSA bed, and the third TSA bed; and
a dehydration subsystem to remove water from a portion of an engine exhaust flow, the dehydration subsystem including:
a plurality of first dehydration TSA beds upstream of and separate from the plurality of TSA beds; or
a plurality of second dehydration TSA beds that are physically integrated with the respective first, second, and third TSA beds.

2. The carbon capture system of claim 1, wherein the dehydration subsystem includes the plurality of second dehydration TSA beds that are physically integrated with the respective first, second, and third TSA beds.

3. The carbon capture system of claim 2, wherein each TSA bed includes:
a top, a bottom, and one or more sides between the top and the bottom;
a carbon capture media layer;
a first dehydration media layer between the carbon capture media layer and the top; and
a second dehydration media layer between the carbon capture media layer and the bottom.

4. The carbon capture system of claim 3, wherein each TSA bed further includes:
an upper flange at the top;
a first perforated baffle between the upper flange and the first dehydration media layer;
a media support screen between the second dehydration media layer and the bottom;
a second perforated baffle between the media support screen and the bottom; and
a lower flange at the bottom.

5. The carbon capture system of claim 3, wherein each TSA bed further includes:
an internal metal liner surrounding the carbon capture media layer and the first and second dehydration media layers; and
insulation between the internal metal liner and the one or more sides.

6. The carbon capture system of claim 1, wherein the dehydration subsystem includes the plurality of first dehydration TSA beds upstream of and separate from the plurality of TSA beds.

7. The carbon capture system of claim 6, wherein the dehydration subsystem further includes a plurality of valves associated with the plurality of first dehydration TSA beds, and wherein the plurality of valves are configured to, simultaneously, cause a first dehydration TSA vessel, of the plurality of first dehydration TSA beds, to be in a water capture mode and a second dehydration TSA vessel, of the plurality of first dehydration TSA beds, to be in a water regeneration mode.

8. A carbon capture system, comprising:
a plurality of thermal swing adsorption (TSA) beds for $CO_2$ capture, including at least:
a first TSA bed configured to capture $CO_2$ within a capture temperature range and to regenerate captured $CO_2$ at a regeneration temperature range above the capture temperature range;
a second TSA bed configured to capture $CO_2$ within the capture temperature range and to regenerate captured $CO_2$ at the regeneration temperature range; and
a third TSA bed configured to capture $CO_2$ within the capture temperature range and to regenerate captured $CO_2$ at the regeneration temperature range;
a plurality of valves and associated flow paths configured to allow switching operational modes of each of the first TSA bed, the second TSA bed, and the third TSA bed; and
a header assembly coupled between the first, second, and third TSA beds.

9. The carbon capture system of claim 8, wherein each TSA bed includes a top, a bottom, and a side, and wherein the header assembly includes a first plurality of headers coupled to the top of each TSA bed and a second plurality of headers coupled to the bottom of each TSA bed.

10. The carbon capture system of claim 9, further comprising:
a control module configured to control the plurality of valves to provide continuous operation such that, simultaneously,
a first TSA bed, of the plurality of TSA beds, is operated in a capture mode to remove $CO_2$ from an exhaust flow and to output a nitrogen flow,
a second TSA bed, of the plurality of TSA beds, is used in a heated regeneration mode to release $CO_2$ into a production flow, and
a third TSA bed, of the plurality of TSA beds, is operated in a cooling mode to be cooled by a cooling flow.

11. The carbon capture system of claim 10, wherein the first plurality of headers includes a first header configured to be a dry N2 outlet for the first TSA bed, a second header configured to be a hot $CO_2$ inlet for the second TSA bed, and a third header configured to be a dry N2 inlet for the third TSA bed, and wherein the second plurality of headers includes a fourth header configured to be an engine exhaust flow inlet for the first TSA bed, a fifth header configured to be a $CO_2$ outlet for the second TSA bed, and a sixth header configured to be a N2 outlet for the third TSA bed.

12. The carbon capture system of claim 8, wherein the header assembly includes pipes or ducts.

13. The carbon capture system of claim 8, wherein the plurality of TSA beds are independent vessels.

14. The carbon capture system of claim 8, wherein the plurality of TSA beds operate at substantially the same pressure, and wherein the plurality of TSA beds are separate compartments within a single vessel.

15. The carbon capture system of claim 14, wherein the header assembly is integrated with the single vessel.

16. A carbon capture system, comprising:
a plurality of thermal swing adsorption (TSA) beds for $CO_2$ capture, including at least:
a first TSA bed configured to capture $CO_2$ within a capture temperature range and to regenerate captured $CO_2$ at a regeneration temperature range above the capture temperature range;
a second TSA bed configured to capture $CO_2$ within the capture temperature range and to regenerate captured $CO_2$ at the regeneration temperature range; and
a third TSA bed configured to capture $CO_2$ within the capture temperature range and to regenerate captured $CO_2$ at the regeneration temperature range,
wherein each TSA bed includes a top, a bottom, and one or more sides between the top and the bottom, and wherein a diameter or width of the one or more sides is greater than a height between the top and the bottom; and
a plurality of valves and associated flow paths configured to allow switching operational modes of each of the first TSA bed, the second TSA bed, and the third TSA bed.

17. The carbon capture system of claim 16, wherein the plurality of TSA beds include a vertical stack of independent vessels with a plurality of radial manifolds surrounding the vertical stack.

18. The carbon capture system of claim 16, wherein the plurality of TSA beds include independent vessels with a first manifold coupled to the top of each TSA bed and a second manifold coupled to the bottom of each TSA bed.

19. The carbon capture system of claim 16, wherein the plurality of TSA beds include independent shippable modules configured to be arranged into a rectangular-shaped single vessel.

20. The carbon capture system of claim 19, further comprising a manifold assembly coupled between the first, second, and third TSA beds, wherein the manifold assembly, to enable the plurality of TSA beds to be built on a foundation, includes:
ducting only over the top of each TSA bed; and
one or more vertical transfer ducts between the ducting and respective TSA beds.

* * * * *